US012748561B2

(12) United States Patent
Oshima

(10) Patent No.: US 12,748,561 B2
(45) Date of Patent: Sep. 29, 2026

(54) INFORMATION PROCESSING APPARATUS, PRINTER, CONTROL METHOD OF INFORMATION PROCESSING APPARATUS, AND NON-TRANSITORY COMPUTER-READABLE STORAGE MEDIUM STORING PROGRAM

(71) Applicant: SEIKO EPSON CORPORATION, Tokyo (JP)

(72) Inventor: Yoshinori Oshima, Aizuwakamatsu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 226 days.

(21) Appl. No.: 18/733,428

(22) Filed: Jun. 4, 2024

(65) Prior Publication Data

US 2024/0402960 A1 Dec. 5, 2024

(30) Foreign Application Priority Data

Jun. 5, 2023 (JP) ................................. 2023-092195

(51) Int. Cl.
*G06F 3/12* (2006.01)

(52) U.S. Cl.
CPC .......... *G06F 3/1251* (2013.01); *G06F 3/1208* (2013.01); *G06F 3/1256* (2013.01)

(58) Field of Classification Search
None
See application file for complete search history.

(56) References Cited

U.S. PATENT DOCUMENTS

| | | | |
|---|---|---|---|
| 5,833,379 A | 11/1998 | Kano | |
| 5,855,441 A | 1/1999 | Kano | |
| 5,871,293 A | 2/1999 | Kano | |
| 2009/0244603 A1 | 10/2009 | Fukutani et al. | |
| 2020/0406635 A1* | 12/2020 | Yasui | G06F 3/1203 |
| 2021/0026576 A1* | 1/2021 | Ishibashi | G06F 3/1208 |

FOREIGN PATENT DOCUMENTS

| | | |
|---|---|---|
| JP | H09-104137 A | 4/1997 |
| JP | 2009-233884 A | 10/2009 |
| JP | 2021-003838 A | 1/2021 |

* cited by examiner

*Primary Examiner* — Darryl V Dottin
(74) *Attorney, Agent, or Firm* — Oliff PLC

(57) ABSTRACT

An information processing apparatus includes: an acquisition section configured to obtain input information, an input space, and an input length; and a generation section configured to generate print data in accordance with the obtained input information, the input space, and the input length such that an object based on the input information is repeatedly disposed on a print medium in a medium direction with a disposition space corresponding to the input space between the objects with each other, and a maximum number of the objects accommodated in an object area being an area on the print medium with an area length corresponding to the input length in the medium direction are printed in the object area.

5 Claims, 22 Drawing Sheets

INFORMATION PROCESSING APPARATUS, PRINTER, CONTROL METHOD OF INFORMATION PROCESSING APPARATUS, AND NON-TRANSITORY COMPUTER-READABLE STORAGE MEDIUM STORING PROGRAM

The present application is based on, and claims priority from JP Application Serial Number 2023-092195, filed Jun. 5, 2023, the disclosure of which is hereby incorporated by reference herein in its entirety.

BACKGROUND

1. Technical Field

The present disclosure relates to an information processing apparatus, a printer, a control method of an information processing apparatus, and a non-transitory computer-readable storage medium storing a program.

2. Related Art

As disclosed in JP-A-2009-233884, a print data creation device is known that includes: an input mechanism that receives the input of a character string to be printed on a tape-shaped print medium per line; and a creation mechanism that creates print data for repeatedly printing the input character string per line in the corresponding line on the tape-shaped print medium in the length direction. When a label length is specified, the print data creation device creates print data such that the input character string per line is individually printed repeatedly until the length of the input character string becomes the specified label length on the tape-shaped print medium in the length direction.

With the related-art, depending on the print length of an input character string and a specified label length, the last character string among the character strings that are repeatedly printed might be cut off. In this case, there is a problem in that the created printed material does not look good.

SUMMARY

According to an aspect of the present disclosure, there is provided an information processing apparatus including: an acquisition section configured to obtain input information, an input space, and an input length; and a generation section configured to generate print data in accordance with the obtained input information, the input space, and the input length such that an object based on the input information is repeatedly disposed on a print medium in a medium direction with a disposition space corresponding to the input space between the objects with each other, and a maximum number of the objects accommodated in an object area being an area on the print medium with an area length corresponding to the input length in the medium direction are printed in the object area.

According to another aspect of the present disclosure, there is provided a printer including: an acquisition section configured to obtain input information, an input space, and an input length; a generation section configured to generate print data in accordance with the obtained input information, the input space, and the input length such that an object based on the input information is repeatedly disposed on a print medium in a medium direction with a disposition space corresponding to the input space between the objects with each other, and a maximum number of the objects accommodated in an object area being an area on the print medium with an area length corresponding to the input length in the medium direction are printed in the object area; and a print section configured to print the object on the print medium in accordance with the print data.

According to still another aspect of the present disclosure, there is provided a control method of an information processing apparatus, the method causing the information processing apparatus to perform processing including: obtaining input information, an input space and an input length; and generating print data in accordance with the obtained input information, the input space, and the input length such that an object based on the input information is repeatedly disposed on a print medium in a medium direction with a disposition space corresponding to the input space between the objects with each other, and a maximum number of the objects accommodated in an object area being an area on the print medium with an area length corresponding to the input length in the medium direction are printed in the object area.

According to still another aspect of the present disclosure, there is provided a non-transitory computer-readable storage medium storing a program, the program causing an information processing apparatus to perform processing including: obtaining input information, an input space and an input length; and generating print data in accordance with the obtained input information, the input space, and the input length such that an object based on the input information is repeatedly disposed on a print medium in a medium direction with a disposition space corresponding to the input space between the objects with each other, and a maximum number of the objects accommodated in an object area being an area on the print medium with an area length corresponding to the input length in the medium direction are printed in the object area.

DESCRIPTION OF EMBODIMENTS

In the following, with reference to the attached drawings, a description will be given of an information processing apparatus, a printer, a control method of an information processing apparatus, and a non-transitory computer-readable storage medium storing a program. In this regard, descriptions will be given in some drawings by using directions based on an XYZ orthogonal coordinate system or an XZ orthogonal coordinate system. However, these directions are only for convenience of explanation, and do not limit the following embodiments in any way.

Figure 1:
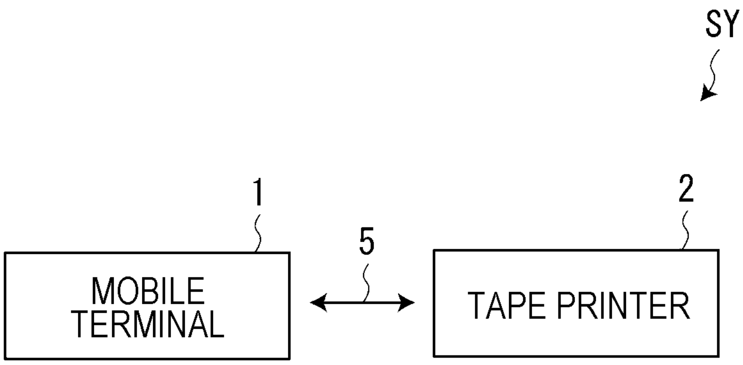
FIG. 1 is a system configuration diagram of a tape print system.

FIG. 1 is a system configuration diagram of a tape print system SY. The tape print system SY includes a mobile terminal 1 and a tape printer 2, and these devices are coupled via a cable 5 in a manner that allows communication. The mobile terminal 1 is a smart device such as a smartphone or the like and is an example of the "information processing apparatus". Also, the tape printer 2 is an example of the "printer". In this regard, the mobile terminal 1 and the tape printer 2 may be connected via wireless communication instead of the cable 5, and may be connected via a network.

Figure 3:
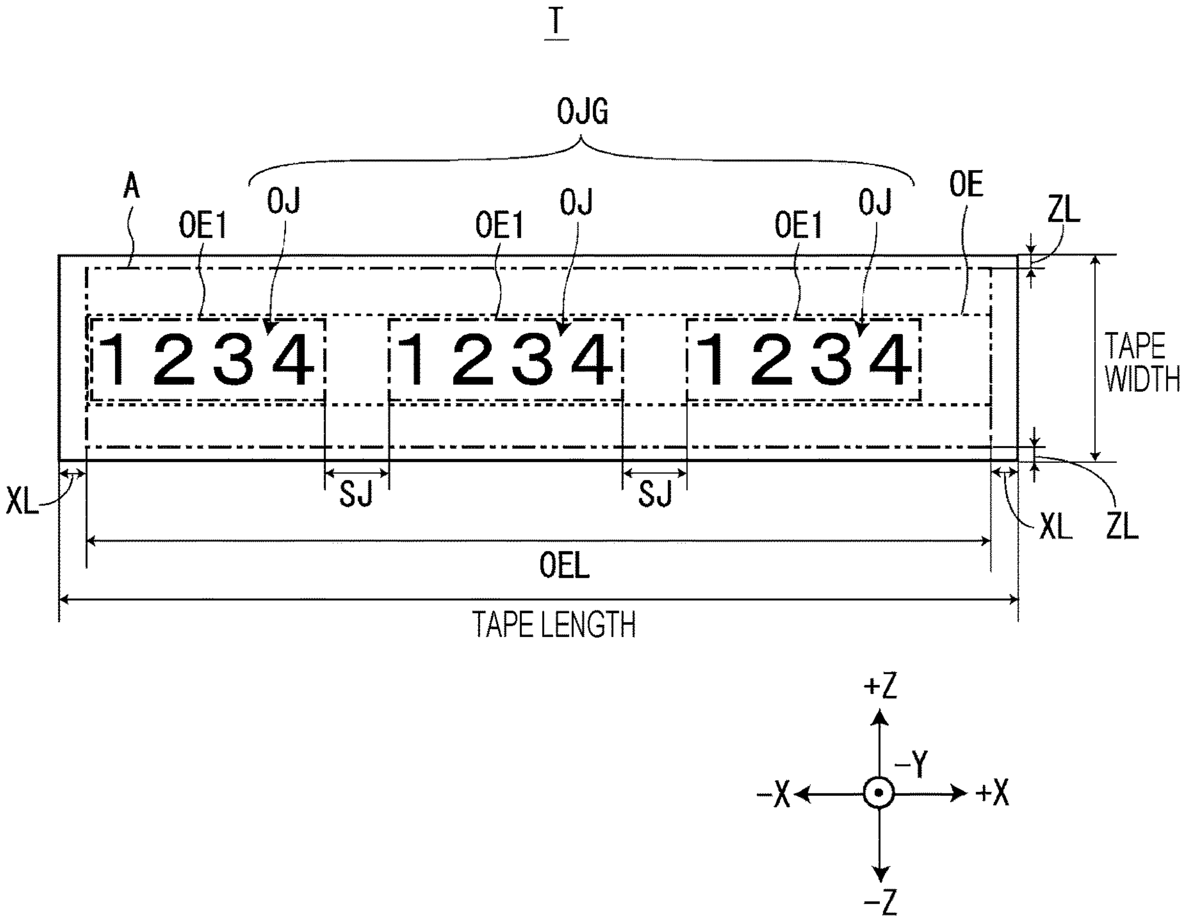
FIG. 3 is a diagram illustrating an example of a tape on which objects are printed.

As illustrated in FIG. 3, the mobile terminal 1 generates print data for printing on a tape T, which is a print medium of the tape printer 2, and transmits the generated print data to the tape printer 2. The tape printer 2 prints an object OJ on the tape T in accordance with the print data transmitted from the mobile terminal 1. An object OJ refers to a display element, such as text, an image, or the like.

Figure 6:
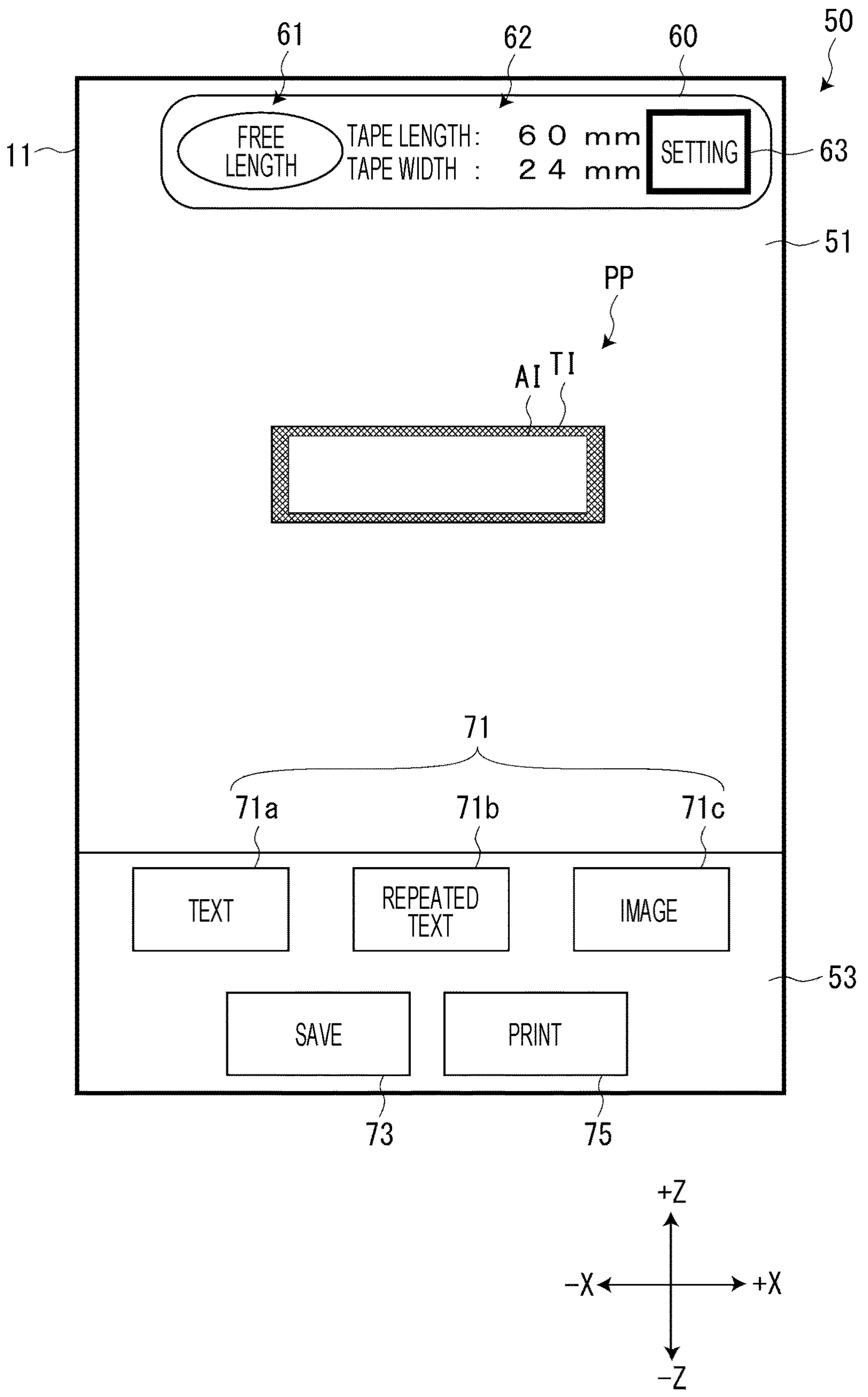
FIG. 6 is a diagram illustrating an example of an edit screen including a function selection area.
Figure 9:
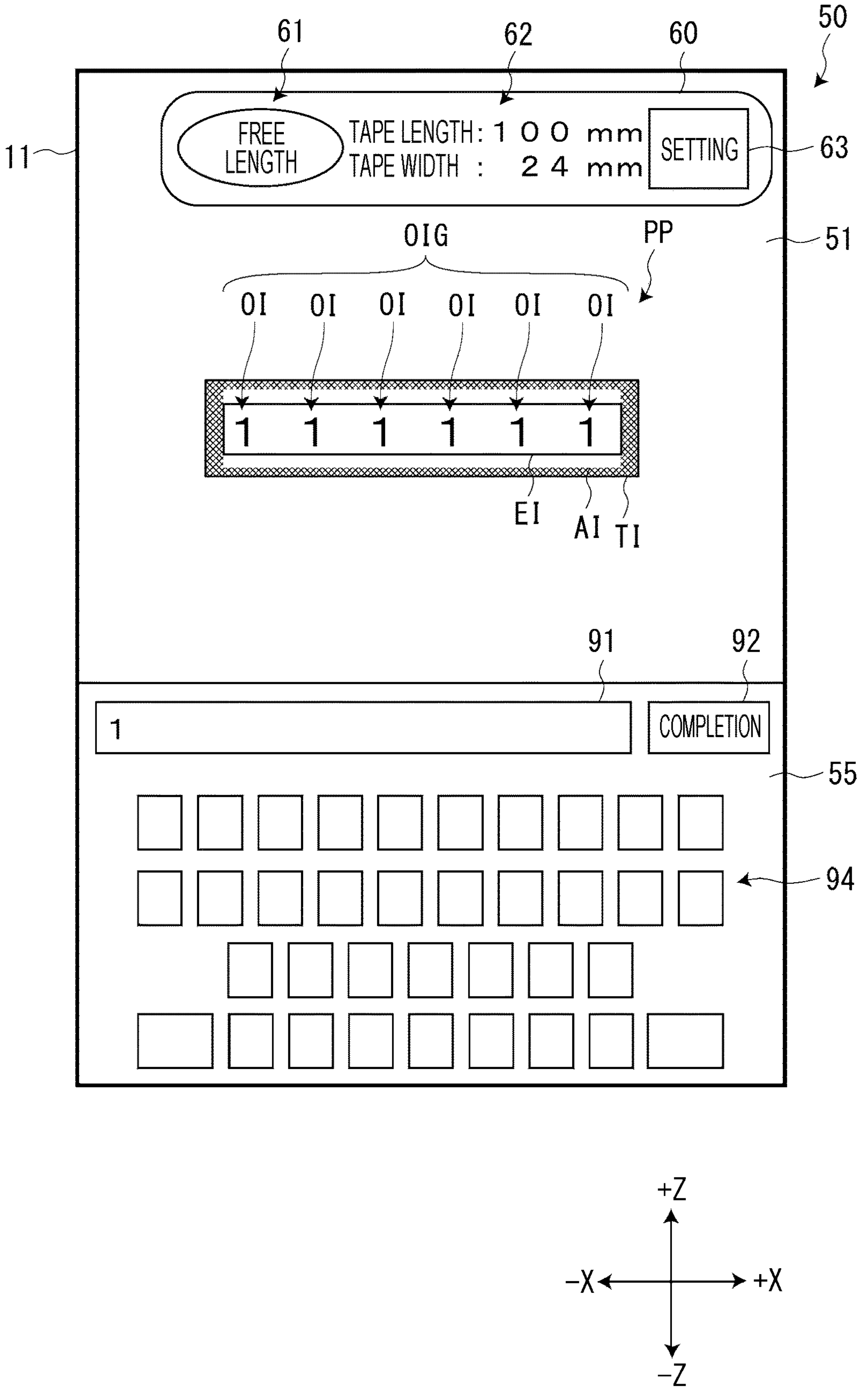
FIG. 9 is a diagram illustrating an example of the edit screen including a text input area where text "1" is input.

As illustrated in FIG. 6, the mobile terminal 1 displays an edit screen 50 for editing an object OJ on a touch panel 11. The touch panel 11 is an example of the "display section". As illustrated in FIG. 9, a print preview PP on which an object image OI simulating the object OJ is superimposed is displayed on a tape image TI simulating the tape T on the edit screen 50. A user is able to perform an edit operation on the object OJ while confirming a print result of the tape T by using the print preview PP.

Figure 2:
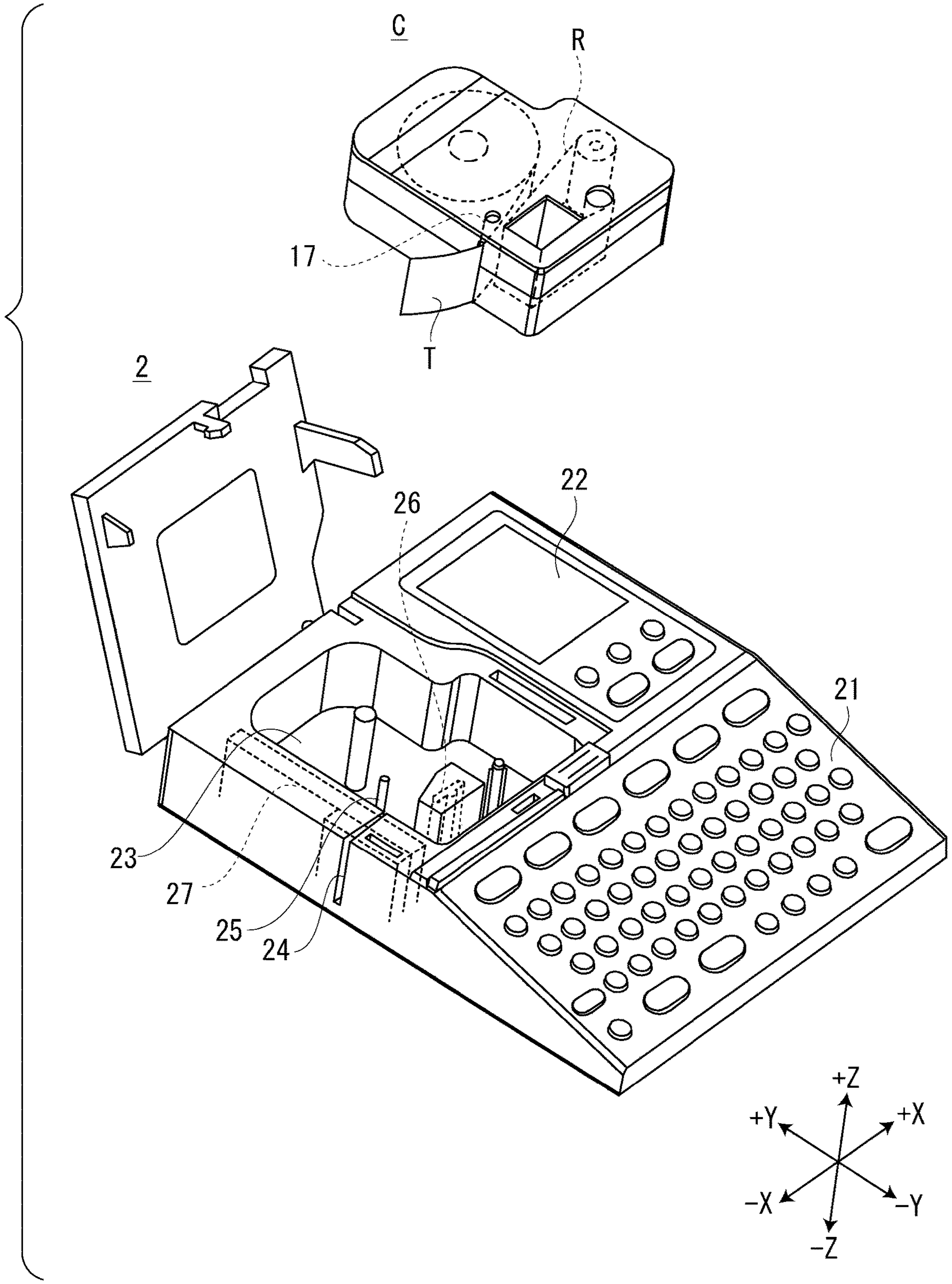
FIG. 2 is an outer view of a tape printer and a tape cartridge.

FIG. 2 is an outer view of the tape printer 2 and a tape cartridge C. The tape printer 2 includes an operation key group 21, a printer display 22, a cartridge loading section 23, and a tape discharge opening 24.

The operation key group 21 receives various operations by the user. The printer display 22 displays various kinds of information. Although the user is able to perform the edit operation of an object OJ by using the operation key group 21 and the printer display 22, in the present embodiment, it is assumed that the mobile terminal 1 performs the edit operation. Also, it is assumed that the tape printer 2 receives an edit result of the object OJ produced by the mobile terminal 1 as print data and performs printing in accordance with the received print data.

The tape cartridge C is loaded onto the cartridge loading section 23 in a detachable manner. The tape cartridge C contains the tape T and an ink ribbon R in its case. Also, the tape cartridge C includes a platen roller 17 that feeds the tape T.

The cartridge loading section 23 includes a platen drive shaft 25 and a thermal head 26. The platen drive shaft 25 is engaged with the platen roller 17 in the state in which the tape cartridge C is loaded onto the cartridge loading section 23. The platen roller 17 feeds the tape T in the −X-direction.

The thermal head 26 is disposed at a position facing the platen roller 17 in the state in which the tape cartridge C is loaded onto the cartridge loading section 23. The thermal head 26 is driven to generate heat in accordance with the print data transmitted from the mobile terminal 1. Thereby, the ink of the ink ribbon R is transferred to the tape T so that the object OJ based on the print data is printed on the tape T.

The printed tape T is ejected from the tape discharge opening 24. A cutter 27 is disposed between the cartridge loading section 23 and the tape discharge opening 24. The cutter 27 cuts the tape T in the Z-axis direction. Thereby, the printed part of the tape T is cut off to be created as a printed material. In this regard, the Z-axis direction includes the −Z-direction and the +Z-direction.

FIG. 3 is a diagram illustrating an example of the tape T on which the objects OJ are printed. FIG. 3 illustrates the tape T on which a plurality of objects OJ are repeatedly printed in the X-axis direction by a repeated text print function described later. The X-axis direction includes the −X-direction and the +X-direction, and is an example of the "medium direction". The example in FIG. 3 illustrates the objects OJ that are printed when text "1234" is input as the input information.

Here, a description will be given of the repeated text print function. The mobile terminal 1 obtains input information, an input space, and an input length in accordance with the user operation when carrying out the repeated text print function. When the repeated text print function is specified by the user, the mobile terminal 1 generates print data so as to dispose the object OJ based on the input information repeatedly on the tape T in the X-axis direction with a disposition space SJ corresponding to the input space with each other. FIG. 3 illustrates individual areas OE1, each of which denoted by a dash-dotted line indicates a disposition area of the object OJ based on the input information and is a rectangular area with two sides parallel to the X-axis direction and the other two sides parallel to the Z-axis direction. A disposition space SJ corresponds to a gap between individual areas OE1 with each other in the X-axis direction.

At this time, the mobile terminal 1 generates print data such that a maximum number of the objects OJ based on the input information accommodated in an object area OE with an area length OEL corresponding to the input length are printed in the object area OE. The object area OE is an area denoted by a broken line in FIG. 3 and is a rectangular area with two sides parallel to the X-axis direction and the other two sides parallel to the Z-axis direction. The function of generating print data such that the object OJ is repeatedly disposed in the object area OE in this manner is the repeated text print function. The user is able to easily create a highly decorative tape-shaped printed material on which a plurality of objects OJ are repeatedly disposed, for example, a wrapping ribbon by using the repeated text print function.

Also, as described above, the mobile terminal 1 disposes a plurality of objects OJ in the object area OE such that a maximum number of the objects OJ based on the input information are accommodated in the object area OE with the area length OEL corresponding to the input length. For example, when the mobile terminal 1 repeatedly disposes the object OJ from the end of the object area OE in the −X-direction, the mobile terminal 1 does not dispose in the object area OE an object OJ that is not entirely accommodated in the object area OE. Accordingly, the user is able to obtain a good looking printed material on which the objects OJ are printed without interruption.

A print area A on which the object OJ is printable is defined on the tape T. The print area A is an area denoted by a dash-double-dot line in FIG. 3. The print area A is an area ranging in the X-axis direction from a position away in the +X-direction from the end of the tape T in the −X-direction by a first margin length XL to a position away in the −X-direction from the end of the tape T in the +X-direction by the first margin length XL. Also, the print area A is an area ranging in the Z-axis direction from a position away in the −Z-direction from the end of the tape T in the +Z-direction by a second margin length ZL to a position away in the +Z-direction from the end of the tape T in the −Z-direction by the second margin length ZL.

In this regard, it is possible to set the first margin length XL in a setting dialog 80 described later. Also, in the present embodiment, it is assumed that the second margin length ZL is a fixed length. In this regard, the first margin length XL may be a fixed length or a length uniquely set in accordance with the tape width.

Also, the print area A, the object area OE, and the individual areas OE1 are indicated in FIG. 3 for explanation, and not actually printed on the tape T.

Also, as described above, the mobile terminal 1 displays the edit screen 50 for editing the object OJ on the touch panel 11. The print preview PP is displayed on the edit screen 50, and the tape image TI and a print display area AI included in the print preview PP, and the object image OI and an object image area EI illustrated in FIG. 9 correspond to the tape T, the print area A, the object OJ, and the object area OE illustrated in FIG. 3 respectively. Accordingly, in the following, a direction is indicated in the description of edit screen 50 by using the X-axis and the Z-axis illustrated in FIG. 3. The tape image TI is an example of the "medium image".

Also, in the following description, the length of the tape T in the X-axis direction is referred to a "tape length", and the length of the tape T in the Z-axis direction is referred to a "tape width".

Figure 4:
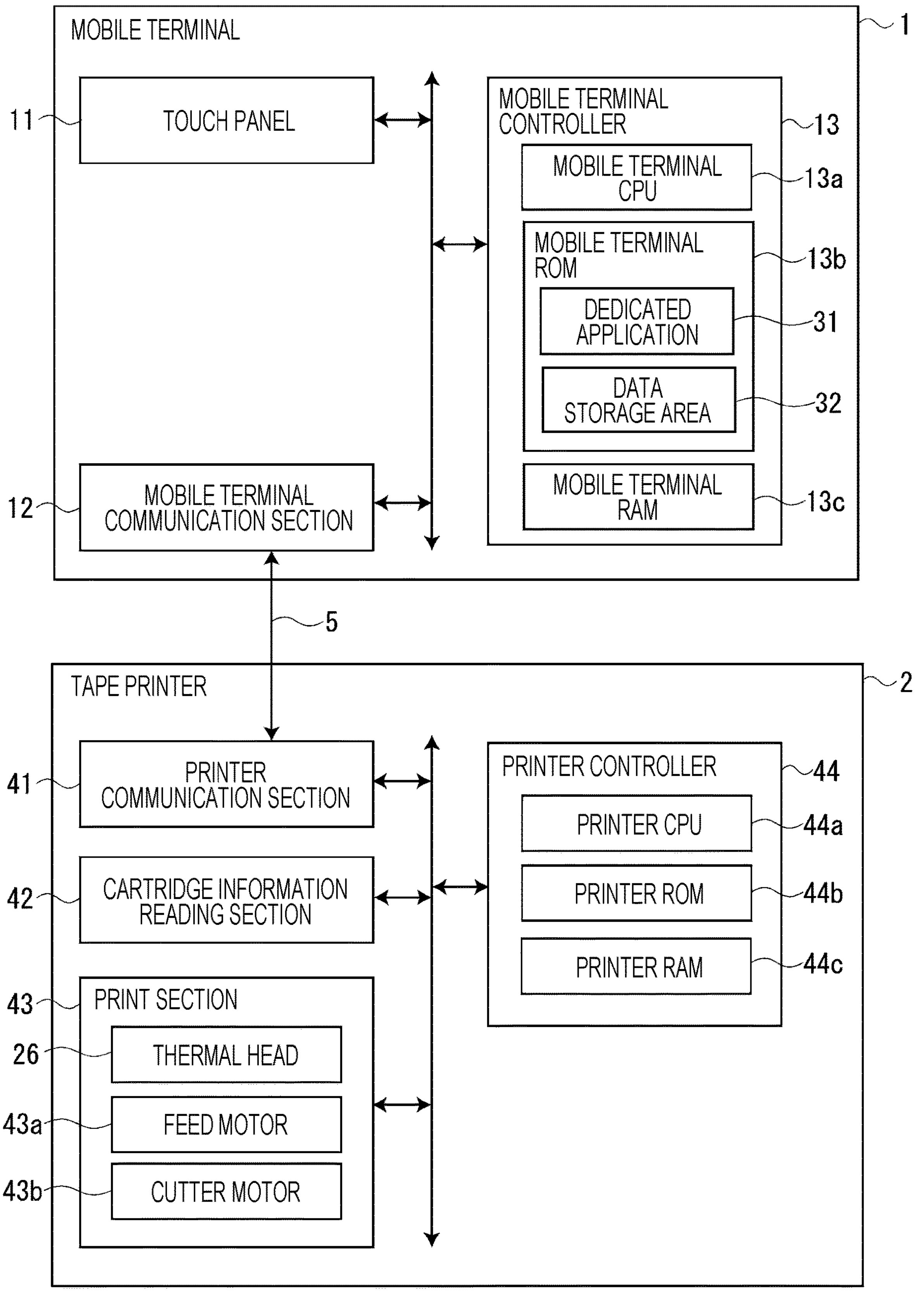
FIG. 4 is a block diagram illustrating the hardware configuration of a mobile terminal and the tape printer.

FIG. 4 is a block diagram illustrating the hardware configuration of the mobile terminal 1 and the tape printer 2. The mobile terminal 1 includes a touch panel 11, a mobile terminal communication section 12, and a mobile terminal controller 13.

The touch panel 11 functions as a display mechanism and an operation mechanism. For example, the touch panel 11 displays the edit screen 50 and is used for various operations on the edit screen 50.

The mobile terminal communication section 12 communicates with the tape printer 2 via the cable 5. For example, the mobile terminal communication section 12 transmits print data to the tape printer 2 and receives cartridge information indicating the type of the tape cartridge C loaded onto the tape printer 2 from the tape printer 2.

The mobile terminal controller 13 includes a mobile terminal CPU (central processing unit) 13*a*, a mobile terminal ROM (read only memory) 13*b*, and a mobile terminal RAM (random access memory) 13*c*.

The mobile terminal CPU 13*a* performs various controls by loading various programs stored in the mobile terminal ROM 13*b* to the mobile terminal RAM 13*c* and executing the programs. In this regard, the mobile terminal controller 13 may use a hardware circuit such as an ASIC (application specific integrated circuit) or the like as a processor instead of the mobile terminal CPU 13*a*. Also, the processor may have a configuration in which one or more CPUs and a hardware circuit such as an ASIC or the like work in combination.

The mobile terminal ROM 13*b* is a rewritable ROM and stores a dedicated application 31 and a data storage area 32. The dedicated application 31 is an example of the "program".

The dedicated application 31 is an application program for performing the display of the edit screen 50, the generation of print data, the communication with the tape printer 2, and the like. In the data storage area 32, various setting values of the dedicated application 31 and the edit data generated by the dedicated application 31 are stored.

The tape printer 2 includes a printer communication section 41, a cartridge information reading section 42, a print section 43, and a printer controller 44.

The printer communication section 41 communicates with the mobile terminal 1 via the cable 5.

The cartridge information reading section 42 optically reads cartridge information from a code image (illustration is omitted) disposed on the external surface of the tape cartridge C loaded onto the cartridge attachment section 23. Alternatively, the cartridge information reading section 42 reads the cartridge information from a circuit substrate (illustration is omitted) including a memory element and disposed on the tape cartridge C. The cartridge information includes the information indicating the tape width of the tape T contained in the tape cartridge C.

The print section 43 is a mechanism for printing on the tape T and includes the thermal head 26, a feed motor 43*a*, and a cutter motor 43*b*. The thermal head 26 includes a plurality of heating elements and performs printing by thermally transferring ink from the ink ribbon R onto the tape T. The feed motor 43*a* is the drive source for feeding the tape T. The cutter motor 43*b* is the drive source for driving the cutter 27.

The printer controller 44 includes a printer CPU 44*a*, a printer ROM 44*b*, and a printer RAM 44*c*.

The printer CPU 44*a* loads a control program such as firmware or the like stored in the printer ROM 44*b* to the printer RAM 44*c* and executes the program so as to perform various controls. In this regard, instead of the printer CPU 44*a*, the printer controller 44 may use a hardware circuit such as an ASIC or the like as the processor. Also, the processor may have a configuration in which one or more CPUs and a hardware circuit such as an ASIC or the like work in combination.

By using the control program stored in the printer ROM 44*b*, the printer CPU 44*a* performs printing on the tape T wound from the tape cartridge C in accordance with the print data transmitted from the mobile terminal 1. Also, when receiving a cartridge information request signal from the mobile terminal 1, the printer CPU 44*a* obtains cartridge information via the cartridge information reading section 42 and transmits the obtained cartridge information to the mobile terminal 1.

Figure 5:
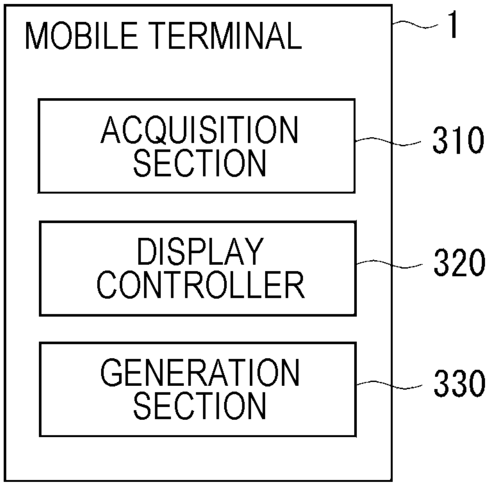
FIG. 5 is a block diagram illustrating the functional configuration of the mobile terminal.

A description will be given of the functional configuration of the mobile terminal 1 with reference to FIG. 5. The mobile terminal 1 includes an acquisition section 310, a display controller 320, and a generation section 330. These functions are all the functions that are realized by the dedicated application 31 performed by the mobile terminal CPU 13*a*.

The acquisition section 310 obtains input information, an input space, and an input length. When the user specifies the repeated text print function, the acquisition section 310 obtains these kinds of information. In the present embodiment, it is assumed that the input information is text information.

Also, the acquisition section 310 obtains format information indicating the format setting of the object image group OIG including a plurality of object images OI repeatedly disposed in the X-axis direction on the edit screen 50. An object image group OIG is a generic name of a plurality of object images OI to be disposed in the object image area EI when the repeated text print function is specified.

The acquisition section 310 obtains, for example, rotation information indicating the rotation of the object image OI as format information. In addition, the format information includes information indicating a format setting, such as a font setting, a character decoration setting, a character gap setting, a line gap setting, and the like.

Also, the acquisition section 310 obtains a duplication instruction of the object image group OIG. In this regard, the acquisition section 310 obtains the above-described input information, the input space, the input length, the format information, and the duplication instruction in accordance with the user operation on the edit screen 50.

Figure 13:
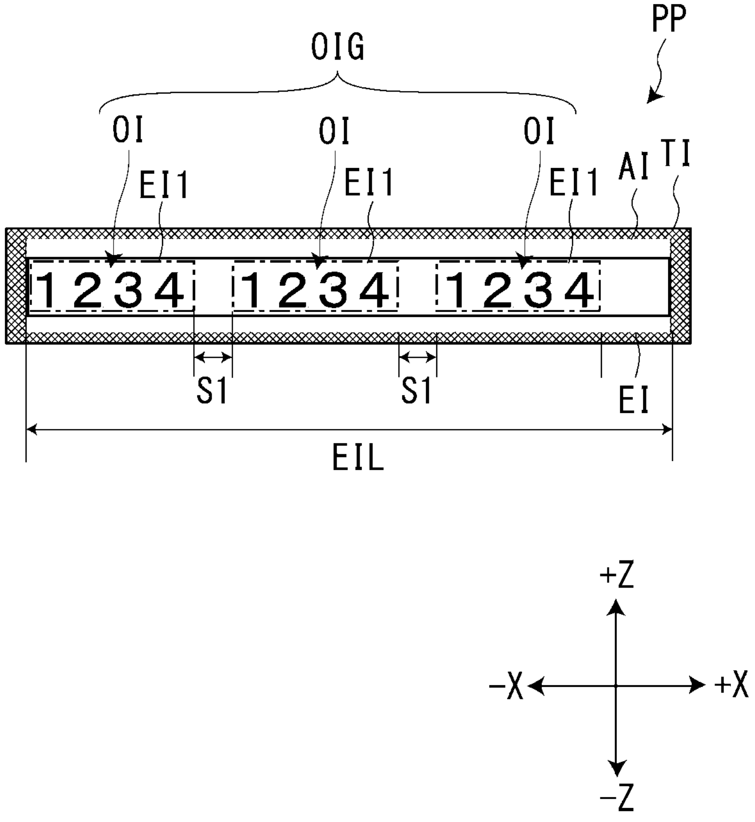
FIG. 13 is an explanatory diagram of a print preview illustrated in FIG. 12.

When the user specifies the repeated text print function, the display controller 320 performs the display control of the touch panel 11 as follows in accordance with the input information, the input space, and the input length that were obtained by the acquisition section 310. The display controller 320 performs the display control of the touch panel 11 such that the object image OI based on the input information is repeatedly disposed on the tape image TI in the X-axis direction with the display disposition space SI corresponding to the input space between the object images OI with each other as illustrated in FIG. 13. The X-axis direction is an example of the "display direction". At this time, the display controller 320 performs the display control of the touch panel 11 such that the maximum number of the object images OI based on the input information accommodated in the object image area EI are displayed in the object image area EI. The object image area EI is an area displayable on the tape image TI with the display area length EIL illustrated in FIG. 13, which corresponds to the input length, as the length in the X-axis direction.

Also, when the acquisition section 310 obtains format information, the display controller 320 reflects the format setting indicated by the format information on a plurality of the object images OI included in the object image group OIG per the object image group OIG, and displays the object images OI on the touch panel 11. For example, when the acquisition section 310 obtains rotation information, the display controller 320 reflects the format setting indicated by the rotation information on a plurality of the object images OI included in the object image group OIG by rotating the object images OI per the object image OI.

Also, when the acquisition section 310 obtains a duplication instruction, the display controller 320 duplicates the object image group OIG and displays a plurality of the object image groups OIG on the touch panel 11.

Also, the display controller 320 displays the object image area EI on the touch panel 11. In the present embodiment, when the object image group OIG is in a selected state, the display controller 320 displays the object image area EI in which the object image group OIG is disposed on the touch panel 11. On the other hand, when the object image group OIG is in a deselected state, the display controller 320 does not display the object image area EI in which the object image group OIG is disposed on the touch panel 11.

When the user specifies the repeated text print function, the generation section 330 generates print data as follows in accordance with the input information, the input space, and the input length that were obtained by the acquisition section 310. The generation section 330 generates print data in an object area OE such that an object OJ based on the input information is repeatedly disposed on the tape T in the X-axis direction with a disposition space SJ corresponding to the input space between the objects OJ with each other, and a maximum number of the objects OJ accommodated in the object area OE are printed in the object area OE.

With reference to FIG. 6 to FIG. 17, a description will be given of a specific example of the display of the edit screen 50 and the operation of the edit screen 50. FIG. 6 is a screen displayed when the user selects a menu selection button indicating the creation of a new tape in a menu screen (illustration is omitted) displayed immediately after the dedicated application 31 is started. On the edit screen 50 illustrated in FIG. 6, a print preview area 51 and a function selection area 53 are displayed.

Tape information display area 60 and a print preview PP are displayed in the print preview area 51. In the tape information display area 60, tape length setting information 61, tape size information 62, and a setting button 63 are displayed. Among these, reference values of the tape length setting information 61 and the tape size information 62 that are set in the dedicated application 31 in advance are displayed until an object selection button 71 described later is selected.

The tape length setting information 61 is the information indicating whether the tape length setting is "free length" or "fixed length". "Free length" is the tape length setting in which the tape length is determined in accordance with the end position in the +X-direction of the object area OE illustrated in FIG. 3. When the tape length setting is "free length", the mobile terminal 1 determines the tape length such that the position away from the end of the object area OE in the +X-direction by the first margin length XL in the +X-direction becomes the end in the +X-direction of the tape T. On the other hand, "fixed length" is the tape length setting in which the tape length is determined to be a fixed length specified by the user. In the following description, it is assumed that the tape length setting is set to "free length".

The tape size information 62 includes the tape length information and the tape width information. When the tape length setting is "free length", the tape length information changes in accordance with the length of the tape image TI included in the print preview PP in the X-axis direction. Also, when the tape length setting is "fixed length", for the tape length information, the tape length set in the setting dialog 80 described later is displayed. For the tape width information, the tape width set in the setting dialog 80 described later or the tape width based on the cartridge information obtained from the tape printer 2 is displayed.

The setting button 63 is a button for displaying the setting dialog 80. A description will be given later of the setting dialog 80.

The print preview PP includes the tape image TI simulating the tape T, and the print display area AI which is an area in the tape image TI and indicates a print area A on the tape T. In FIG. 6, the print display area AI is a blank area in the center of the tape image TI. When the mobile terminal 1 obtains the information necessary for printing the object OJ, such as the input information or the like, the mobile terminal 1 displays object images OI simulating objects OJ as a part of the print preview PP as illustrated in FIG. 9. Further, when the object image OI is selected, the mobile terminal 1 displays an object image area EI indicating the area of the object images OI as illustrated in FIG. 9.

In the function selection area 53, an object selection button 71, a save button 73, and a print button 75 are displayed. The object selection button 71 includes a text button 71*a*, a repeated text button 71*b*, and an image button 71*c*. When the text button 71*a* is selected, the mobile terminal 1 displays one object image OI indicating the text based on the input information as a part of the print preview PP. Also, when the repeated text button 71*b* is selected, the mobile terminal 1 displays, a maximum number of the object images OI indicating the text based on the input information accommodated in the object image area EI as a part of the print preview PP. That is, the repeated text button 71*b* is a button that specifies the repeated text print function. When the image button 71*c* is selected, the mobile terminal 1 displays the object image OI indicating the image selected by the user as a part of the print preview PP.

When the save button 73 is selected, the mobile terminal 1 saves the image of the print preview PP displayed in the print preview area 51 and the various setting values used for generating the print preview PP in the data storage area 32 in the mobile terminal ROM 13*b*. Also, when the print button 75 is selected, the mobile terminal 1 generates the print data corresponding to the print preview PP displayed in the print preview area 51, and transmits the generated print data to the tape printer 2. The selection of the print button 75 is an example of the "print instruction".

Figure 7:
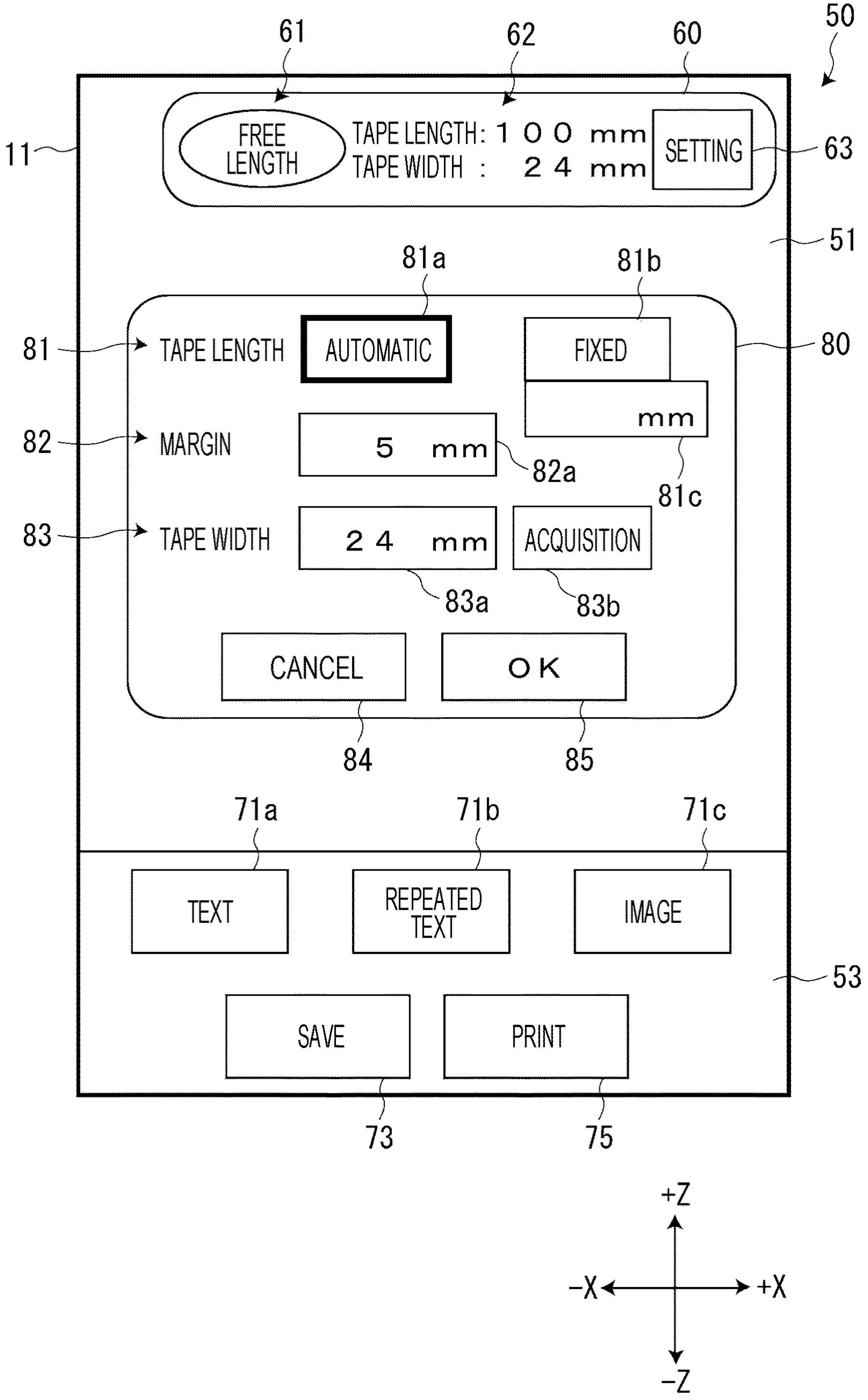
FIG. 7 is a diagram illustrating an example of the edit screen on which a setting dialog is displayed.

When the setting button 63 is selected on the edit screen 50 illustrated in FIG. 6, the mobile terminal 1 displays the setting dialog 80 in the print preview area 51 as illustrated in FIG. 7.

In the setting dialog 80, a tape length setting area 81, a margin setting area 82, a tape width setting area 83, a cancel button 84, and a first OK button 85 are displayed. The tape length setting area 81 is an area for setting whether the tape length setting is "free length" or "fixed length" and includes an automatic button 81*a*, a fixed button 81*b*, and a tape length input field 81*c*. When the automatic button 81*a* is selected, the mobile terminal 1 sets the tape length setting to "free length". Also, when the fixed button 81*b* is selected, the mobile terminal 1 sets the tape length setting to "fixed length" and sets the tape length to the length input in the tape length input field 81*c*.

The margin setting area 82 is an area for setting the first margin length XL and includes a margin input field 82*a*. The mobile terminal 1 sets the length input to the margin input field 82*a* as the first margin length XL.

The tape width setting area 83 is an area for setting the tape width and includes a tape width selection field 83*a* and a tape width acquisition button 83*b*. The mobile terminal 1 displays a plurality of tape width choices in the tape width selection field 83*a*. When the user selects any one of the tape width choices from a plurality of the tape width choices, the mobile terminal 1 displays the tape width indicated by the selected tape width choice in the tape width selection field 83*a*. Also, when the user selects the tape width acquisition button 83*b*, the mobile terminal 1 transmits a cartridge information request signal to the tape printer 2 and obtains cartridge information from the tape printer 2. The mobile terminal 1 displays the tape width indicated by the obtained cartridge information in the tape width selection field 83*a*.

When the cancel button 84 is selected, the mobile terminal 1 cancels the settings in the setting dialog 80 and hides the setting dialog 80. Also, when the first OK button 85 is selected, the mobile terminal 1 updates the display of the print preview area 51 and the various setting values in accordance with the settings in the setting dialog 80.

Figure 8:
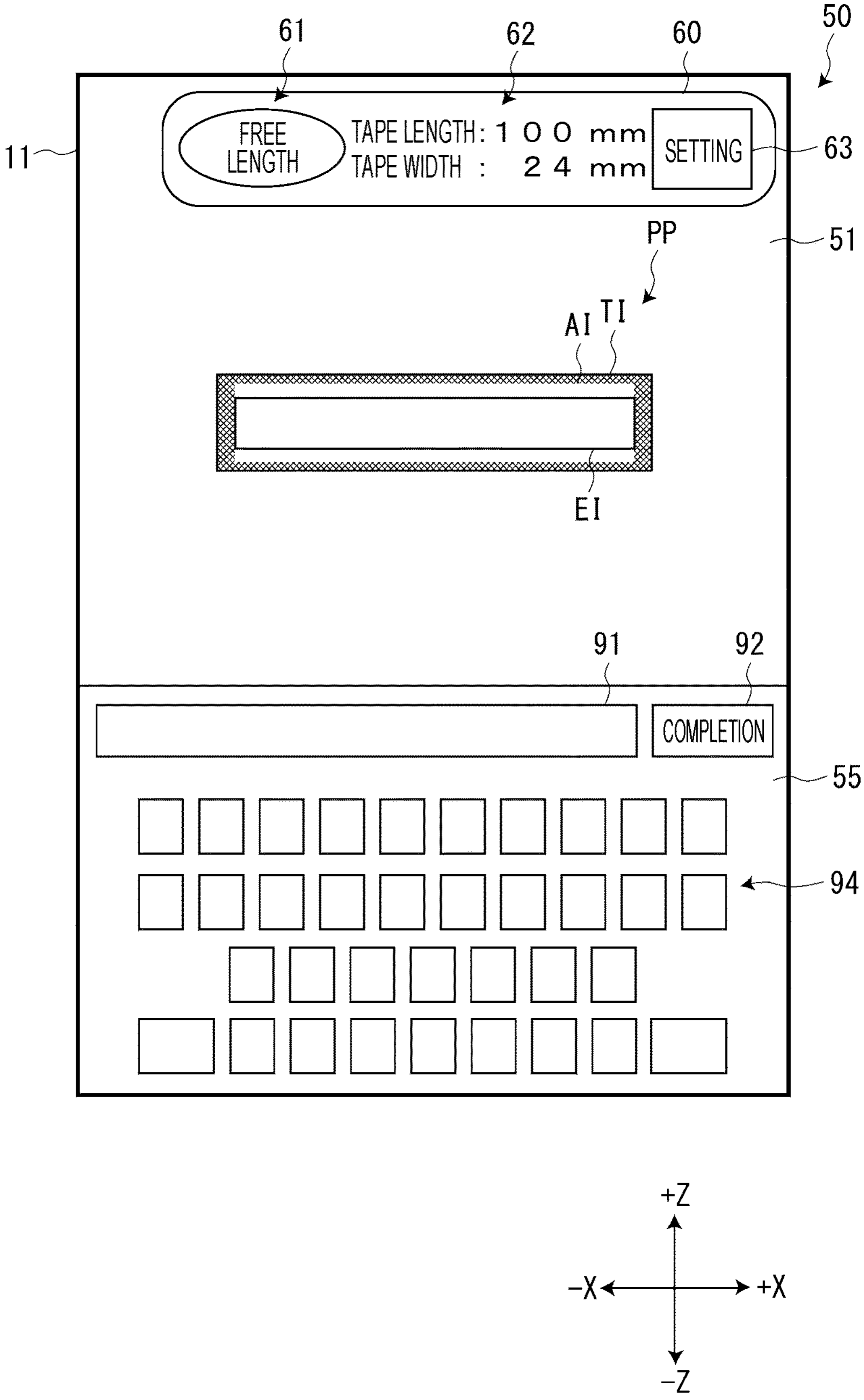
FIG. 8 is a diagram illustrating an example of the edit screen including a text input area.

FIG. 8 illustrates the edit screen 50 displayed when the repeated text button 71*b* is selected on the edit screen 50 illustrated in FIG. 6. On the edit screen 50 illustrated in FIG. 8, the print preview area 51 and a text input area 55 are displayed.

The setting values when the repeated text button 71*b* is selected last time are reflected on the print preview area 51 of the edit screen 50 illustrated in FIG. 8. Hereinafter, the setting values when the repeated text button 71*b* is selected last time are referred to as "previous setting values". Specifically, the previous setting values are reflected on the tape length information and the tape width information that are included in the tape size information 62 and the tape image TI, the print display area AI, and the object image area EI that are included in the print preview PP. At this time, the length of the print display area AI in the X-axis direction is equal to the length of the object image area EI in the X-axis direction.

In the text input area 55, a text input field 91, a completion button 92, and a keyboard 94 are displayed. The keyboard 94 is an onscreen keyboard including text keys and numeric keys. In the text input field 91, the text that has been input by using the keyboard 94 is input. In the text input field 91, it is possible to input a plurality of lines of text. The completion button 92 is the button to be selected by the user when text input is completed.

When text "1" is input to the text input field 91, the mobile terminal 1 displays the object image OI as a part of the print preview PP as illustrated in FIG. 9. The mobile terminal 1 displays the print preview PP for realizing the repeated text print function in accordance with the text "1", which is the input information, and input length and the input space, which are the previous setting values. In the example in FIG. 9, the object image group OIG including six object images OI is included in the print preview PP.

Figure 10:
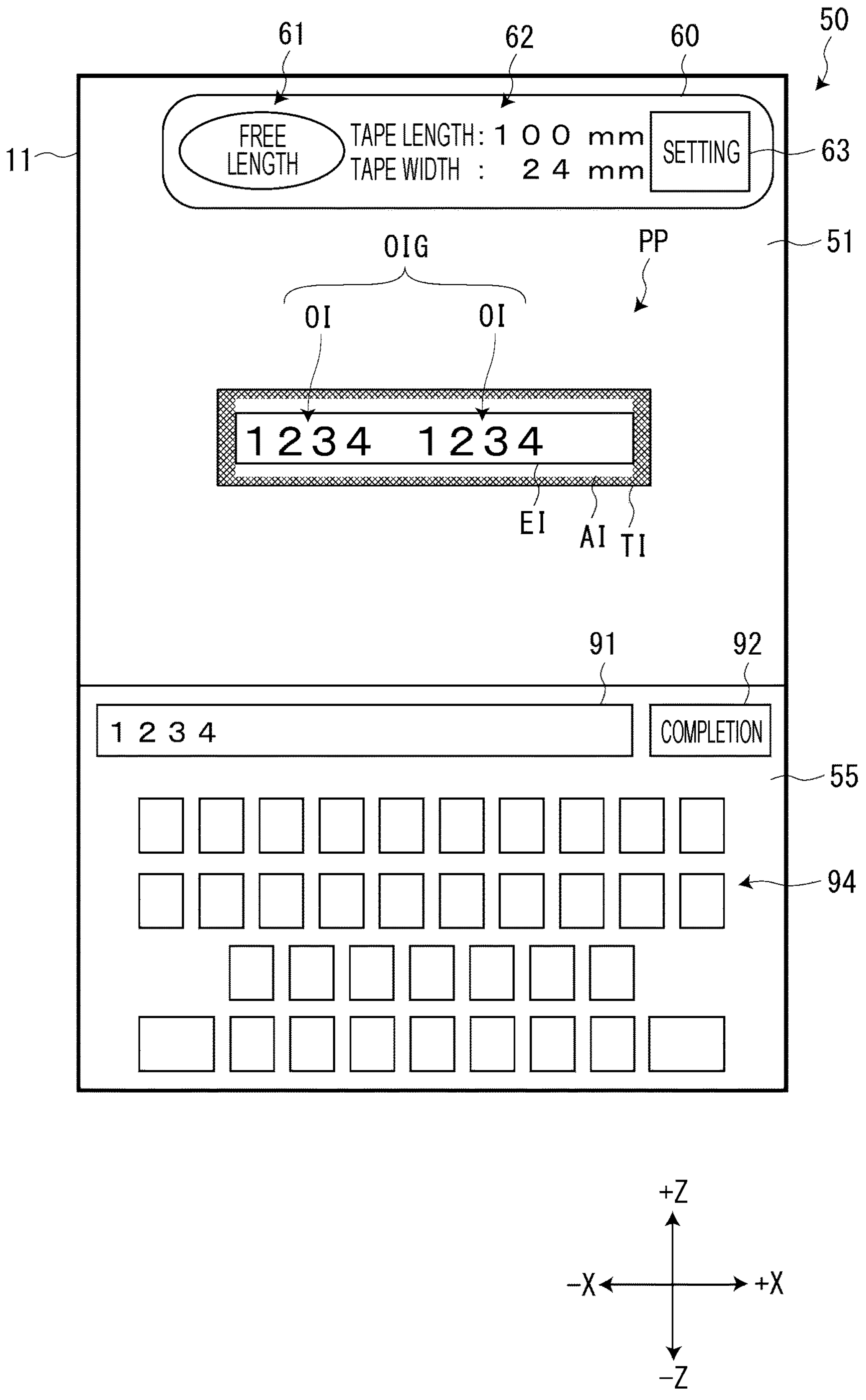
FIG. 10 is a diagram illustrating an example of the edit screen including a text input area where text "1234" is input.

In the state in which text "1" is input in the text input field 91 as illustrated in FIG. 9, when text "234" is further input, that is, when text "1234" is input in the text input field 91, the mobile terminal 1 displays the edit screen 50 illustrated in FIG. 10. In this case, the mobile terminal 1 displays the print preview PP for realizing the repeated text print function in accordance with the text "1234", which is the input information, the input length and the input space, which are the previous setting values. In the example in FIG. 10, print preview PP includes the object image group OIG including the two object images OI.

Figure 11:
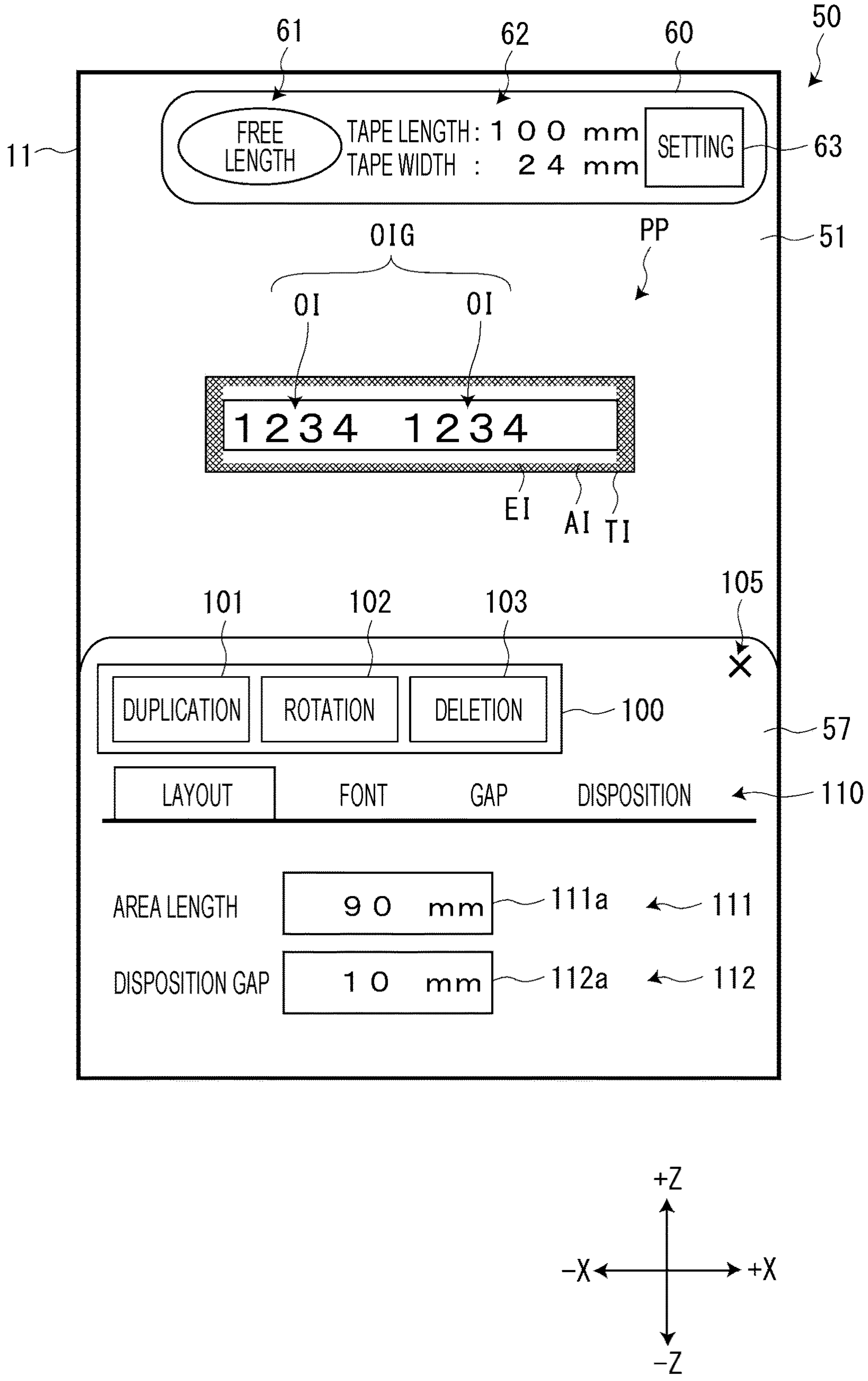
FIG. 11 is diagram illustrating an example of the edit screen in the state in which an object edit area is displayed, and a layout tab is selected in the object edit area.

When the completion button 92 is selected in the state in which text "1234" is input in the text input area 55 as illustrated in FIG. 10, the mobile terminal 1 displays an edit screen 50 illustrated in FIG. 11. That is, the mobile terminal 1 displays an object edit area 57 on the edit screen 50 instead of the text input area 55.

In the object edit area 57, an edit button area 100, a tab group 110, and a close icon 105 are displayed. When the close icon 105 is selected, the mobile terminal 1 hides the object edit area 57 and displays the function selection area 53 illustrated in FIG. 6 on the edit screen 50.

In this regard, in the state in which an object image group OIG is displayed in the print preview area 51, when the repeated text button 71*b* is selected from the function selection area 53, and text is input in the text input field 91, the mobile terminal 1 is able to display a new object image group OIG in the print preview area 51. That is, the mobile terminal 1 is able to display a plurality of object image groups OIG in the print preview area 51.

The edit button area 100 includes a duplication button 101, a rotation button 102, and a delete button 103.

Figure 14:
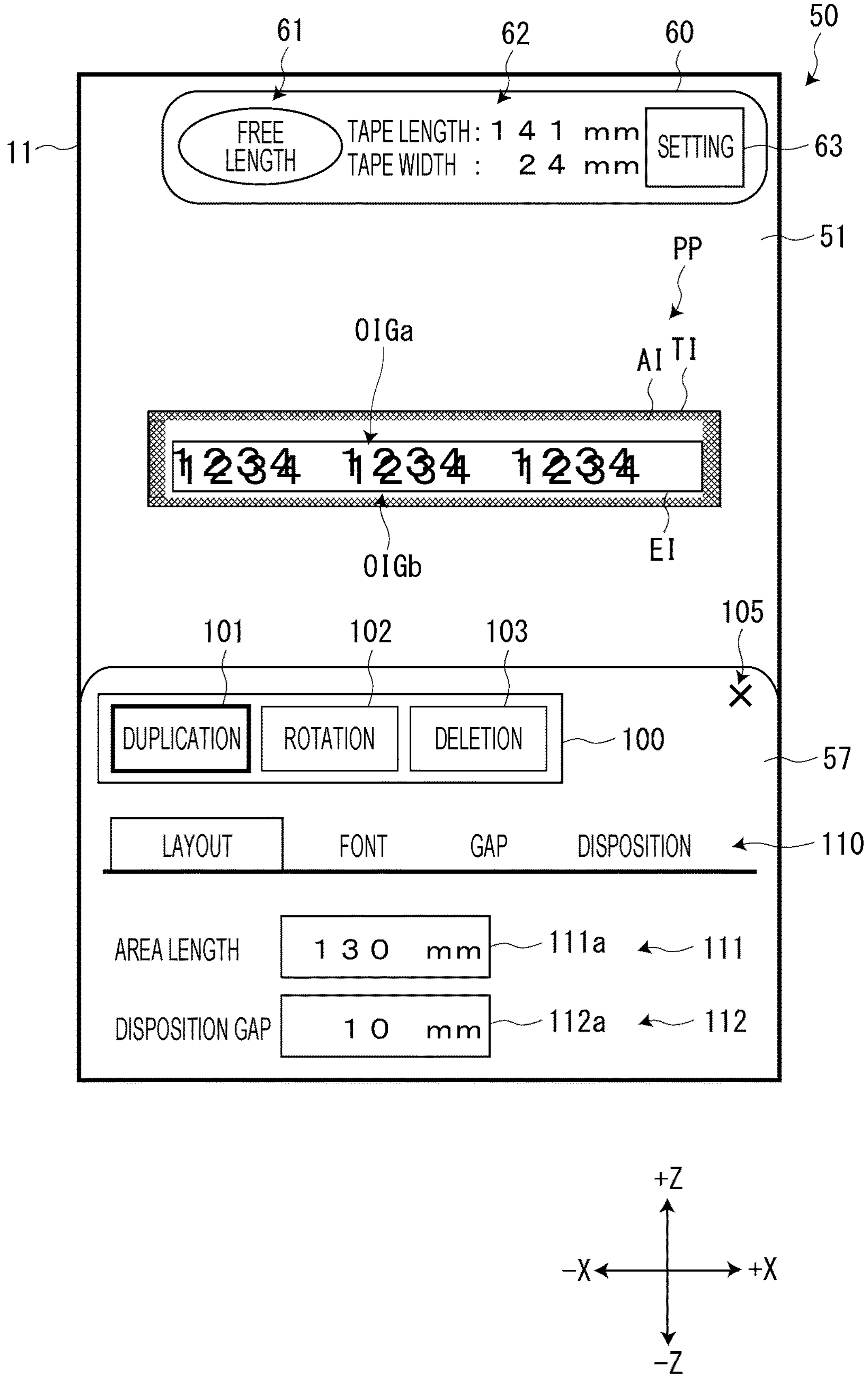
FIG. 14 is a diagram illustrating an example of the edit screen in the state in which an object image group is duplicated.

When the duplication button 101 is selected, the mobile terminal 1 duplicates the object image group OIG displayed in the selected object image area EI in the print preview area 51 as illustrated in FIG. 14. The selection of the duplication button 101 is an example of the "duplication instruction".

Figure 15:
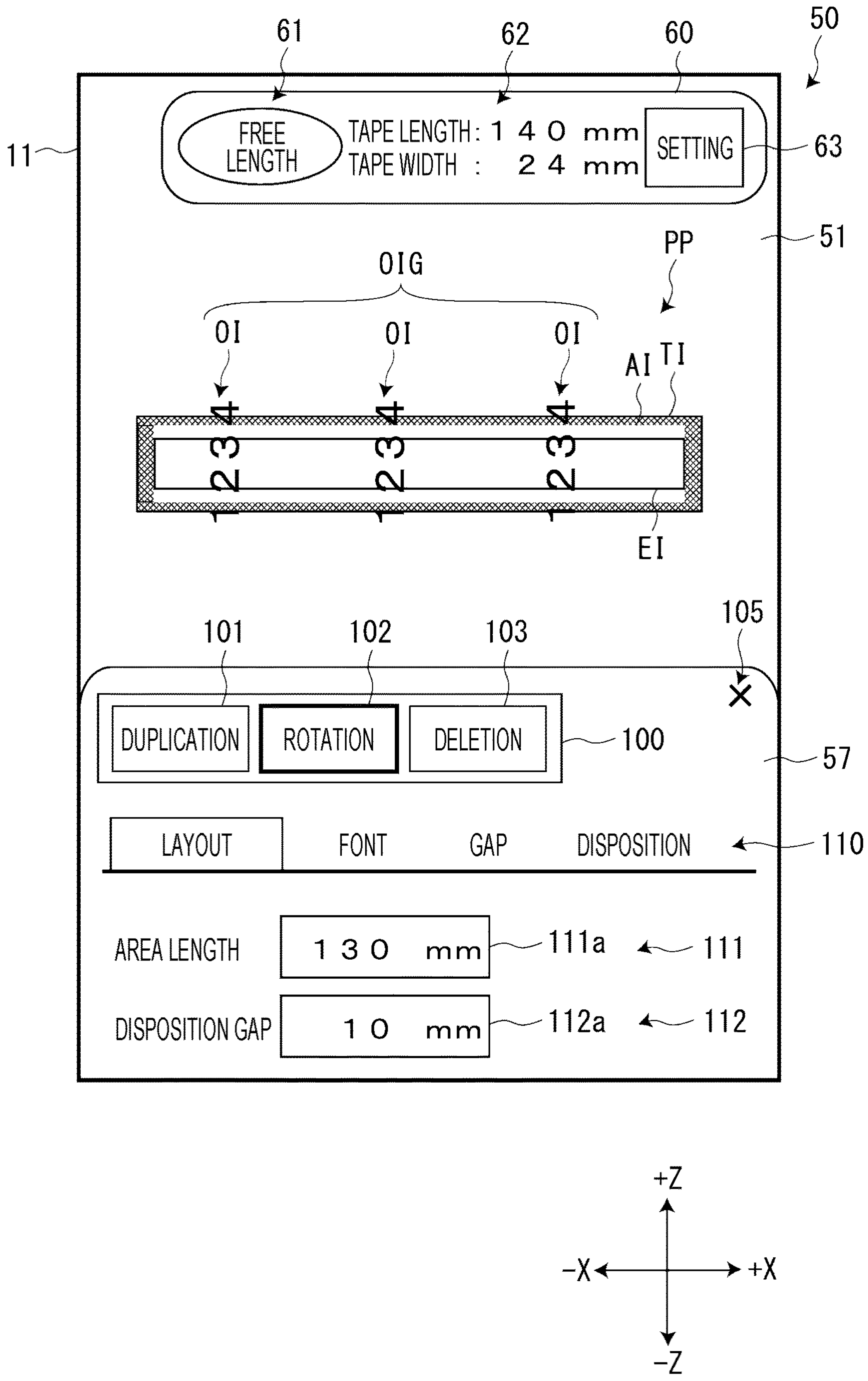
FIG. 15 is a diagram illustrating an example of the edit screen in the state in which a plurality of object images included in the object image group are rotated.

When the rotation button 102 is selected, the mobile terminal 1 rotates a plurality of the object images OI included in the object image group OIG displayed in the selected object image area EI in the print preview area 51 per the object image OI as illustrated in FIG. 15. The information obtained by the acquisition section 310 by selecting the rotation button 102 is an example of the "rotation information" and the "format information".

When the delete button 103 is selected, the mobile terminal 1 deletes the object image group OIG displayed in the selected object image area EI in the print preview area 51.

The tab group 110 includes a layout tab, a font tab, a gap tab, and a disposition tab.

When the layout tab is selected in the tab group 110, the mobile terminal 1 displays an area length setting area 111, a disposition space setting area 112, and an object edit area 57. The area length setting area 111 includes an input length input field 111*a*. The mobile terminal 1 sets the area length OEL of the object area OE and the display area length EIL of the object image area EI in accordance with the input length input in the input length input field 111*a*.

Also, the disposition space setting area 112 includes an input space input field 112*a*. The mobile terminal 1 sets the disposition space SJ of a plurality of objects OJ included in the object group OJG and the display disposition space SI of a plurality of object images OI included in the object image group OIG in accordance with the input space input in the input space input field 112*a*.

In this regard, when the font tab is selected in the tab group 110, the mobile terminal 1 displays a selection field to select the font type, a selection field to select the font size, and a selection field to select the character decoration in the object edit area 57 (illustration is omitted). Also, when the gap tab is selected in the tab group 110, the mobile terminal 1 displays an unillustrated setting field to set the text gap in the X-axis direction and an unillustrated setting field to set the line gap of the text line in the object edit area 57. A description will be given later of the display of the object edit area 57 when the disposition tab is selected in the tab group 110.

In this regard, the information obtained by the acquisition section 310 when the font tab is selected and the selection is performed in each selection field, and the information obtained by the acquisition section 310 when the gap tab is selected and the setting is performed in each setting field are examples of the "format information".

Figure 12:
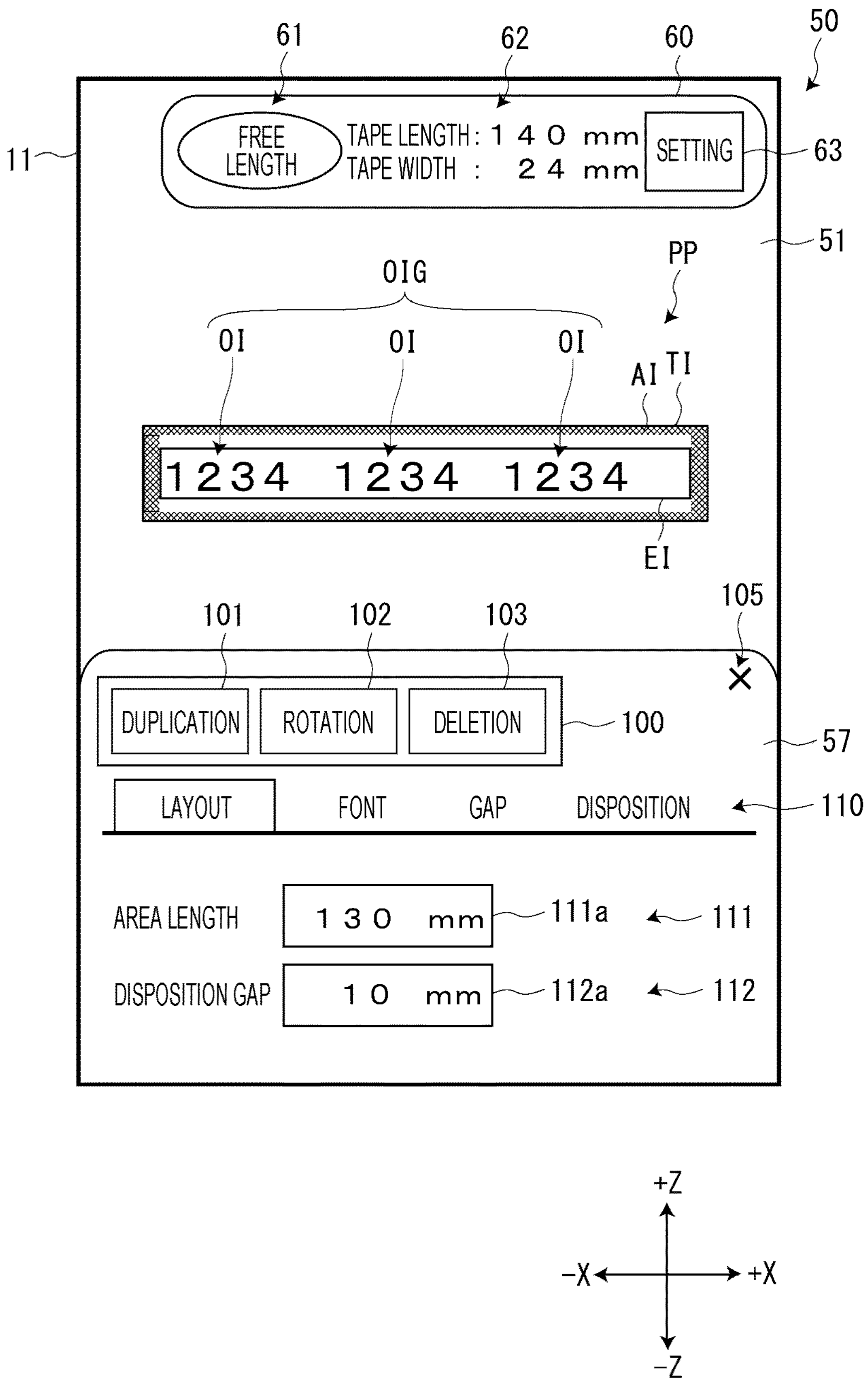
FIG. 12 is a diagram illustrating an example of the edit screen in the state in which an area length is changed from the state of the edit screen illustrated in FIG. 11.

When the input length is changed from "90 mm", which is the previous setting value, to "130 mm" in the area length setting area 111 on the edit screen 50 illustrated in FIG. 11, the mobile terminal 1 displays an edit screen 50 illustrated in FIG. 12. On the edit screen 50 illustrated in FIG. 12, the print preview PP for realizing the repeated text print function is displayed in accordance with the text "1234", which is the input information, the input length "130 mm" displayed in the input length input field 111*a*, and the input space "10 mm" displayed in the input space input field 112*a*.

FIG. 13 is an explanatory diagram of the print preview PP illustrated in FIG. 12. The mobile terminal 1 displays the print preview PP such that the object image OI indicating text "1234" is repeatedly disposed with the display disposition space SI corresponding to the input space "10 mm" with each other in the X-axis direction of the tape image TI. At this time, the mobile terminal 1 displays the print preview PP such that a maximum number of the object images OI, each of which indicates text "1234", that are accommodated in the object image area EI with the display area length EIL corresponding to the input length "130 mm" in the X-axis direction are displayed.

FIG. 13 illustrates individual image areas EI1, each of which denoted by a dash-dotted line indicates the disposition area of the object image OI based on the input information and is a rectangular area with two sides parallel to the X-axis direction and the other two sides parallel to the Z-axis direction. A display disposition space SI corresponds to a gap between individual image areas EI1 with each other in the X-axis direction. In this regard, the individual image areas EI1 are illustrated in FIG. 13 for explanation and are not actually displayed on the edit screen 50. Also, when a plurality of lines of text is input as the input information, the length of the individual image area EI1 in the X-axis direction becomes the length of the longest line in the X-axis direction.

In this regard, the example in FIG. 12 and FIG. 13 illustrates the case when the area length OEL of the object area OE illustrated in FIG. 3 is set to "130 mm", and the first margin length XL in the setting dialog 80 illustrated in FIG. 7 is set to "5 mm". Accordingly, as illustrated in FIG. 12, the tape length displayed in the tape information display area 60 becomes "130+5+5=140 mm".

FIG. 14 illustrates the edit screen 50 displayed when the duplication button 101 is selected on the edit screen 50 illustrated in FIG. 12. When the duplication button 101 is selected in the state in which the object image area EI is selected, the mobile terminal 1 duplicates the object image group OIG displayed in the selected object image area EI.

In FIG. 14, an object image group OIGa is an object image group OIG of a duplication source, and an object image group OIGb is a duplicated object image group OIG. When the duplication button 101 is selected, the duplicated object image group OIGb is in the selected state, and thus the object image area EI of the object image group OIGb is displayed as a part of the print preview PP. Also, the duplicated object image group OIGb is slightly misaligned with respect to the duplication source object image group OIGa in the +X-direction and the −Z-direction. Accordingly, the tape length information displayed in the tape size information 62 is changed from "140 mm" to "141 mm".

FIG. 15 illustrates the edit screen 50 when the rotation button 102 is selected on the edit screen 50 illustrated in FIG. 12. When the rotation button 102 is selected in the state in which the object image area EI is selected, the mobile terminal 1 rotates a plurality of object images OI included in the object image group OIG displayed in the selected object image area EI per the object image OI. When the object image OI is rotated, a part of the object image OI in +Z-direction and a part of the object image OI in the −Z-direction sometimes protrudes from the object image area EI. However, the length of the object image area EI in the Z-axis direction will not be changed. The object image area EI is an area including the object image group OIG when the rotation angle of the object image OI is 0°.

Figure 16:
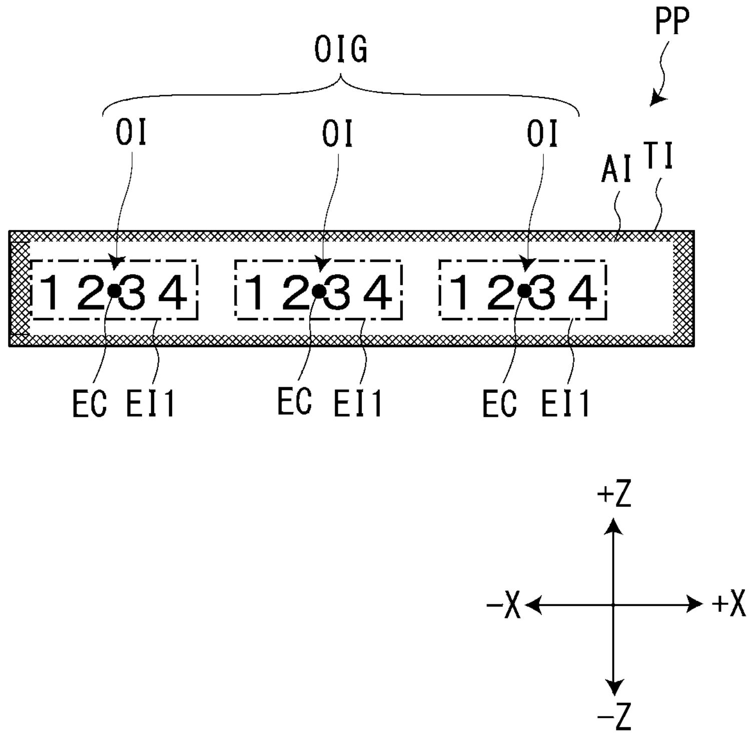
FIG. 16 is an explanatory diagram regarding the rotation of an object image.

FIG. 16 is an explanatory diagram of the rotation of the object image OI. When the object image OI is rotated by the selection of the rotation button 102, the mobile terminal 1 rotates counterclockwise the object image OI by 90° around a center EC of an individual image area EI1. Accordingly, when the rotation button 102 is selected twice, the object image OI becomes the half-rotated state from the state illustrated in FIG. 12. In this manner, the mobile terminal 1 rotates the object image OI counterclockwise by 90° for each selection of the rotation button 102. In this regard, a center EC refers to the center of an individual image area EI1 in the X-axis direction and in the Z-axis direction.

Figure 17:
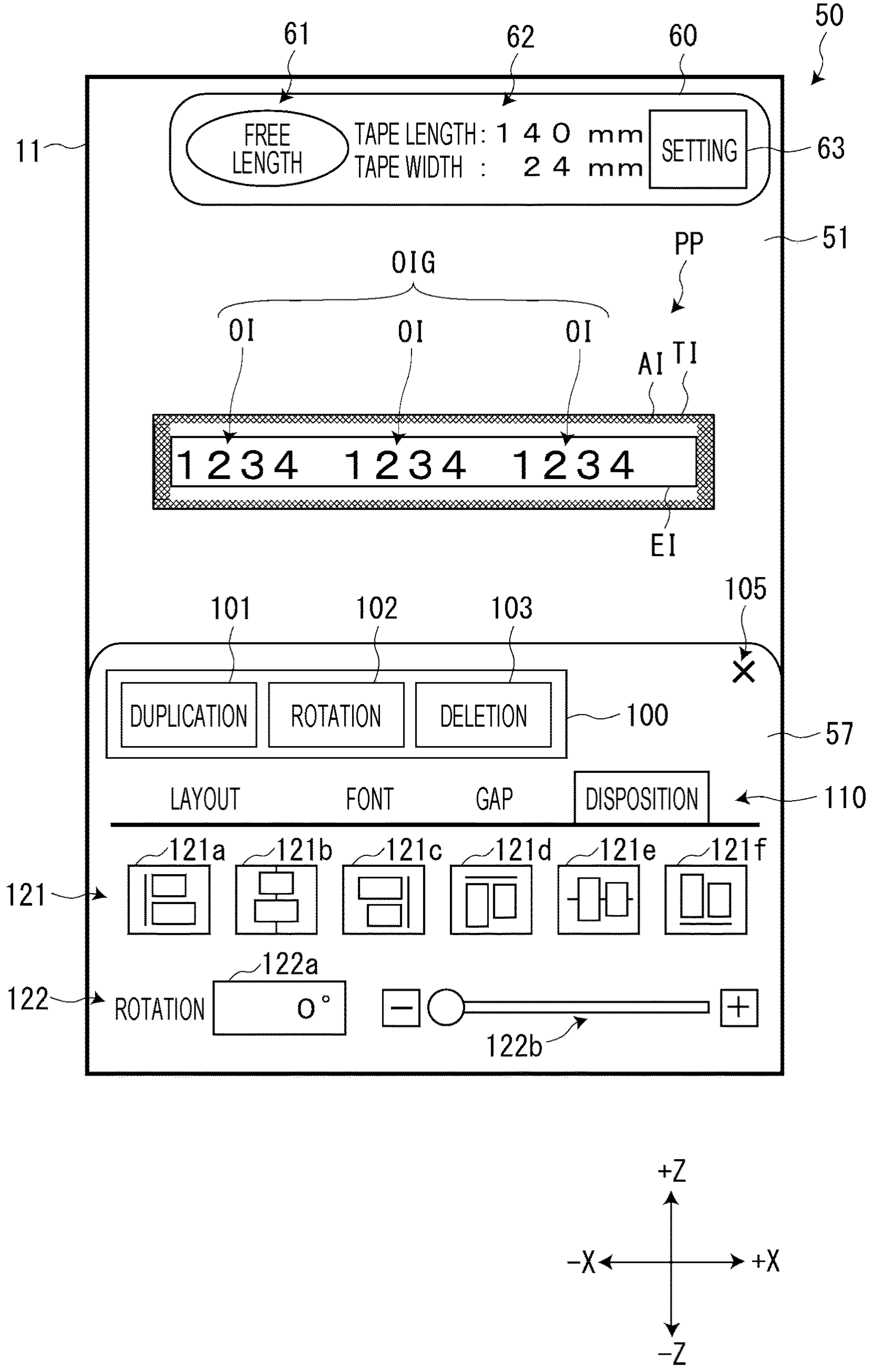
FIG. 17 is a diagram illustrating the edit screen in the state in which an object edit area is displayed, and a disposition tab is selected in the object edit area.

FIG. 17 illustrates an edit screen 50 when the disposition tab is selected from the tab group 110 on the edit screen 50 illustrated in FIG. 12. In this case, the mobile terminal 1 displays a disposition selection area 121 and a rotation angle setting area 122 in the object edit area 57.

The disposition selection area 121 includes a left alignment button 121*a*, a horizontal center alignment button 121*b*, a right alignment button 121*c*, a top alignment button 121*d*, a vertical center alignment button 121*e*, and a bottom alignment button 121*f*.

When the left alignment button 121*a* is selected, the mobile terminal 1 moves the object image area EI such that the end of the selected object image area EI in the −X-direction matches the end of the print display area AI in the −X-direction. Also, when the horizontal center alignment button 121*b* is selected, the mobile terminal 1 moves the object image area EI such that the center position of the selected object image area EI in the X-axis direction matches the center position of the print display area AI in the X-axis direction. When the right alignment button 121*c* is selected, the mobile terminal 1 moves the object image area EI such that the end of the selected object image area EI in the +X-direction matches the end of the print display area AI in the +X-direction. In this regard, the −X-direction is an example of the "first display direction", and the +X-direction is an example of the "second display direction".

Also, when the top alignment button 121*d* is selected, the mobile terminal 1 moves the object image area EI such that the end of the selected object image area EI in the +Z-direction matches the end of the print display area AI in the +Z-direction. Also, when the vertical center alignment button 121*e* is selected, the mobile terminal 1 moves the object image area EI such that the center position of the selected object image area EI in the Z-axis direction matches the center position of the print display area AI in the Z-axis direction. Also, when bottom alignment button 121*f* is selected, the mobile terminal 1 moves the object image area EI such that the end of the selected object image area EI in the −Z-direction matches the end of the print display area AI in the −Z-direction.

The rotation angle setting area 122 includes a rotation angle display field 122*a* and a rotation angle adjustment slider 122*b*. In the rotation angle display field 122*a*, a rotation angle adjusted by the rotation angle adjustment slider 122*b* is displayed. When a slider operator is moved in the +X-direction by the rotation angle adjustment slider 122*b*, the mobile terminal 1 increases the setting value of the rotation angle. Whereas when the slider operator is moved to the −X-direction by the rotation angle adjustment slider 122*b*, the mobile terminal 1 decreases the setting value of the rotation angle. It is possible to adjust the rotation angle from "0°" to "360°" by the rotation angle adjustment slider 122*b*.

The mobile terminal 1 rotates the object image OI displayed in the object edit area 57 in accordance with the operation of the rotation angle adjustment slider 122*b*. In this case, the mobile terminal 1 also moves the object image OI counterclockwise around the center EC of the individual image area EI1. The information obtained by the acquisition section 310 when the rotation angle adjustment slider 122*b* is operated represents an example of the "rotation information" and the "format information".

Figure 18:
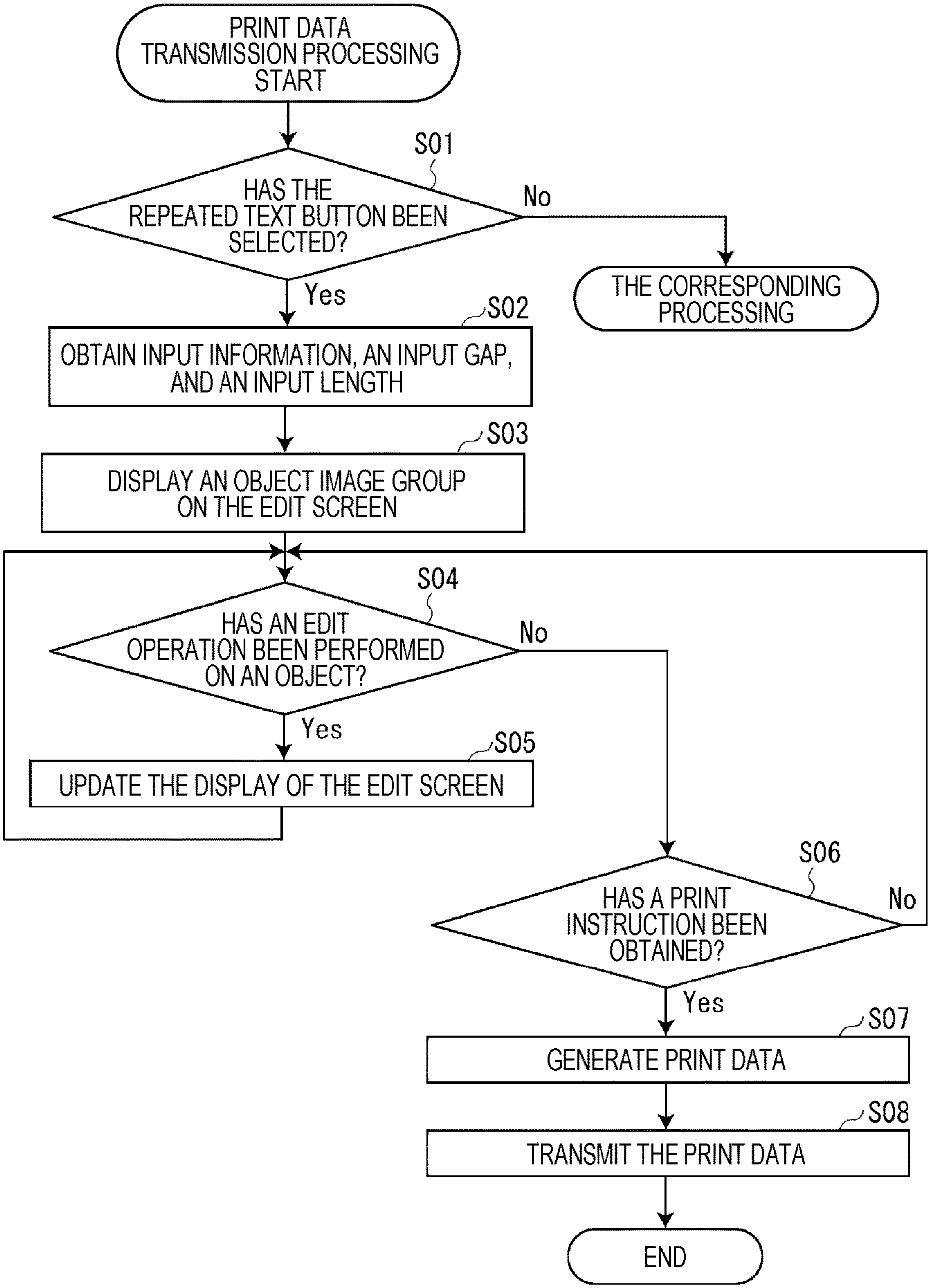
FIG. 18 is a flowchart illustrating print data transmission processing performed by the mobile terminal.

FIG. 18 is a flowchart illustrating the print data transmission processing performed by the mobile terminal 1. The print data transmission processing is an example of the "control method of an information processing apparatus". The print data transmission processing is started by the operation performed by the user of the object selection button 71 illustrated in FIG. 6 as a trigger.

In step S01, the mobile terminal 1 determines whether or not the repeated text button 71*b* has been selected. When the mobile terminal 1 determines that the repeated text button 71*b* has been selected, the processing proceeds to step S02. Whereas when the mobile terminal 1 determines that the repeated text button 71*b* has not been selected, the mobile terminal 1 performs the corresponding processing in accordance with the selected object selection button 71.

In step S02, the mobile terminal 1 obtains input information, an input space, and an input length.

In step S03, the mobile terminal 1 displays an object image group OIG on the edit screen 50 in accordance with the input information, the input space, and the input length that were obtained in step S02.

In step S04, the mobile terminal 1 determines whether or not the edit operation on the object OJ has been performed. The edit operation of the object OJ refers to the change operation of the various setting values in the setting dialog 80 and in the object edit area 57. When the mobile terminal 1 determines that the edit operation of the object OJ has been performed, the processing proceeds to step S05. Whereas when the mobile terminal 1 determines that the edit operation on the object OJ has not been performed, the processing proceeds to step S06.

In step S05, the mobile terminal 1 updates the display of the edit screen 50 in accordance with the edit operation on the object OJ performed in step S04.

In step S06, the mobile terminal 1 determines whether or not the print instruction has been obtained. When the mobile terminal 1 determines that the print instruction has been obtained, the processing proceeds to step S07. Whereas when the mobile terminal 1 determines that the print instruction has not been obtained, the processing returns to step S04.

In step S07, the mobile terminal 1 generates print data in accordance with the input information, the input space, and the input length, which were obtained in step S02. Also, when the edit operation on the object OJ has been performed, the mobile terminal 1 generates print data in accordance with the edit result.

In step S08, the mobile terminal 1 transmits the print data generated in step S07 to the tape printer 2.

As described above, the mobile terminal 1 according to the present embodiment generates print data such that the object OJ based on the input information is disposed repeatedly on the tape T in the X-axis direction with a disposition space SJ corresponding to the input space between the objects OJ with each other. At this time, the mobile terminal 1 generates the print data such that a maximum number of objects OJ based on the input information accommodated in the object area OE with the area length OEL corresponding to the input length in the X-axis direction are printed in the object area OE. Thereby, it is possible for the user to obtain a printed material, on which the object OJ is repeatedly disposed in the X-axis direction on the tape T, and the objects OJ are printed without being cut off, and looks good.

Also, the mobile terminal 1 displays the print preview PP such that the object image OI based on the input information is disposed repeatedly with a display disposition space SI corresponding to the input space between the object images OI with each other in the X-axis direction on the tape image TI. At this time, the mobile terminal 1 displays the print preview PP such that the maximum number of the object images OI based on the input information accommodated in the object image area EI with the display area length EIL corresponding to the input length in the X-axis direction are displayed in the object image area EI. Thereby, the user is able to predict a print result from the display of the print preview PP.

Also, when the mobile terminal 1 obtains the format information indicating the format setting of the object image group OIG, the mobile terminal 1 reflects the format setting indicated by the format information on a plurality of the object images OI included in the object image group OIG for each object image group OIG. Thereby, the user is able to perform the format setting all at once on a plurality of the object images OI included in the object image group OIG for each object image group OIG.

Also, when the mobile terminal 1 obtains rotation information indicating the rotation of the object image OI as the format information, the mobile terminal 1 rotates a plurality of the object images OI included in the object image group OIG for each object image OI. Thereby, the user is able to rotate a plurality of the object images OI included in the object image group OIG all at once.

Also, when the mobile terminal 1 obtains a duplication instruction, the mobile terminal 1 duplicates the object image group OIG and displays a plurality of the object image groups OIG on the edit screen 50. Thereby, the user is able to display a plurality of the object image groups OIG on the edit screen 50 without newly inputting the input information, the input length, and the input space.

Also, the mobile terminal 1 displays the object image area EI on the edit screen 50. Thereby, the user is able to confirm the disposition area of the object image group OIG.

In this regard, it is possible to employ the following variations in addition to the embodiment described above. Also, it is possible to carry out the following variations in combination.

First Variation

As illustrated in FIG. 13, when a margin is created between the end in the +X-direction of the object image OI located most in the +X-direction out of a plurality of the object images OI included in the object image group OIG and the end in the +X-direction of the object image area EI, the mobile terminal 1 may perform the processing for deleting the margin. Hereinafter the margin is referred to as an "area margin".

Figure 19:
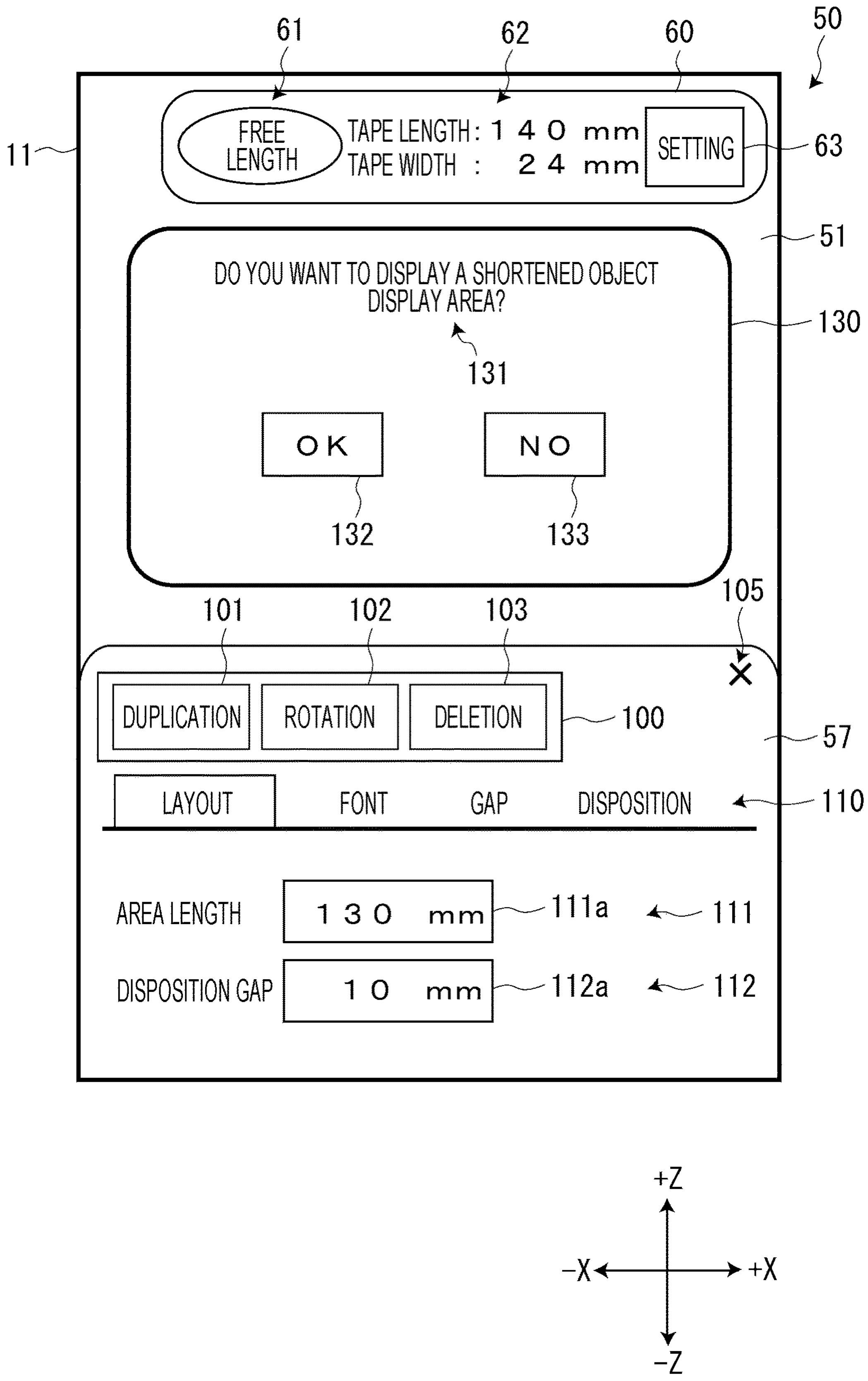
FIG. 19 is a diagram illustrating an example of the edit screen on which a selection dialog is displayed.
Figure 20:
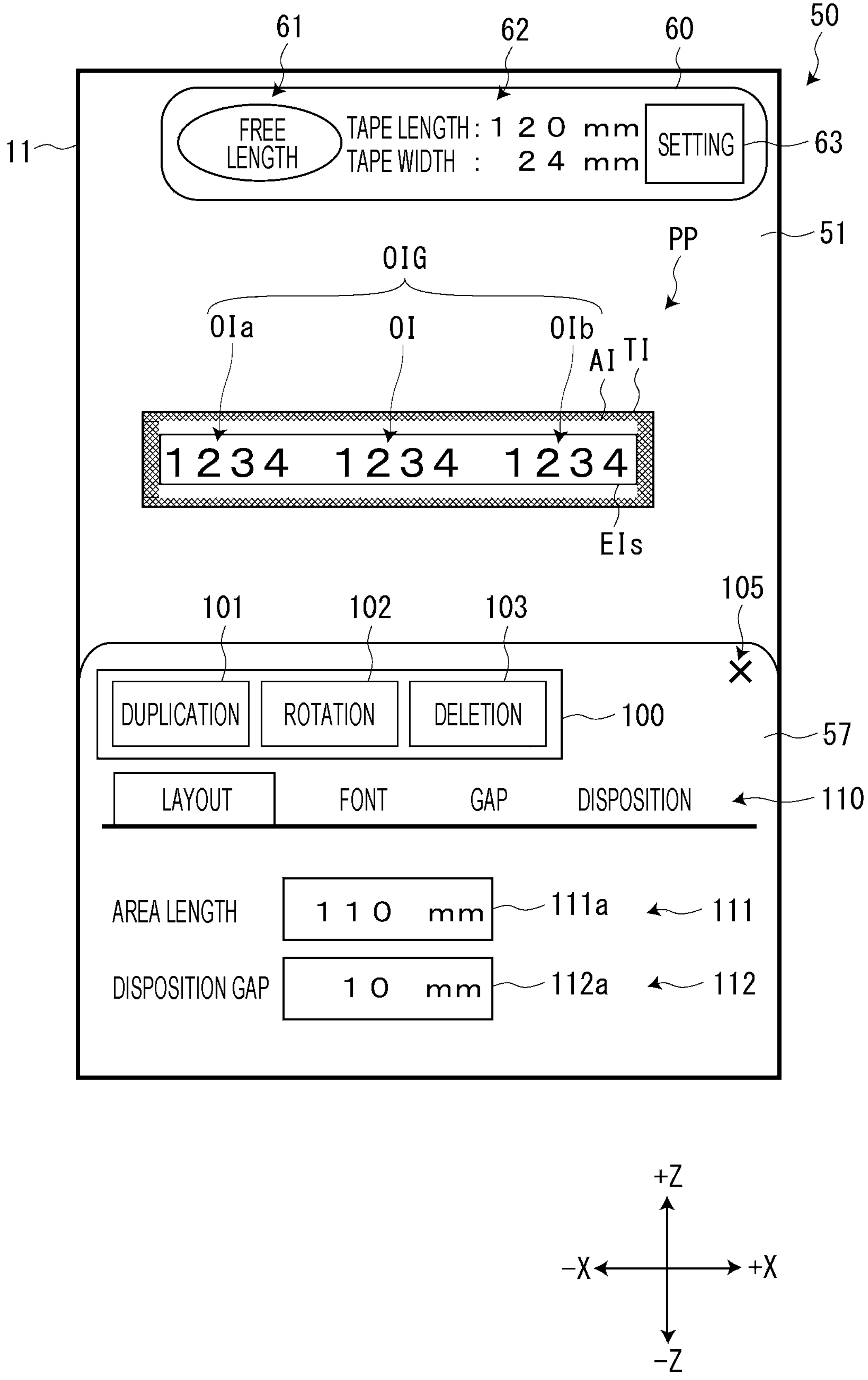
FIG. 20 is a diagram illustrating an example of the edit screen on which a shortened object image area is displayed.
Figure 21:
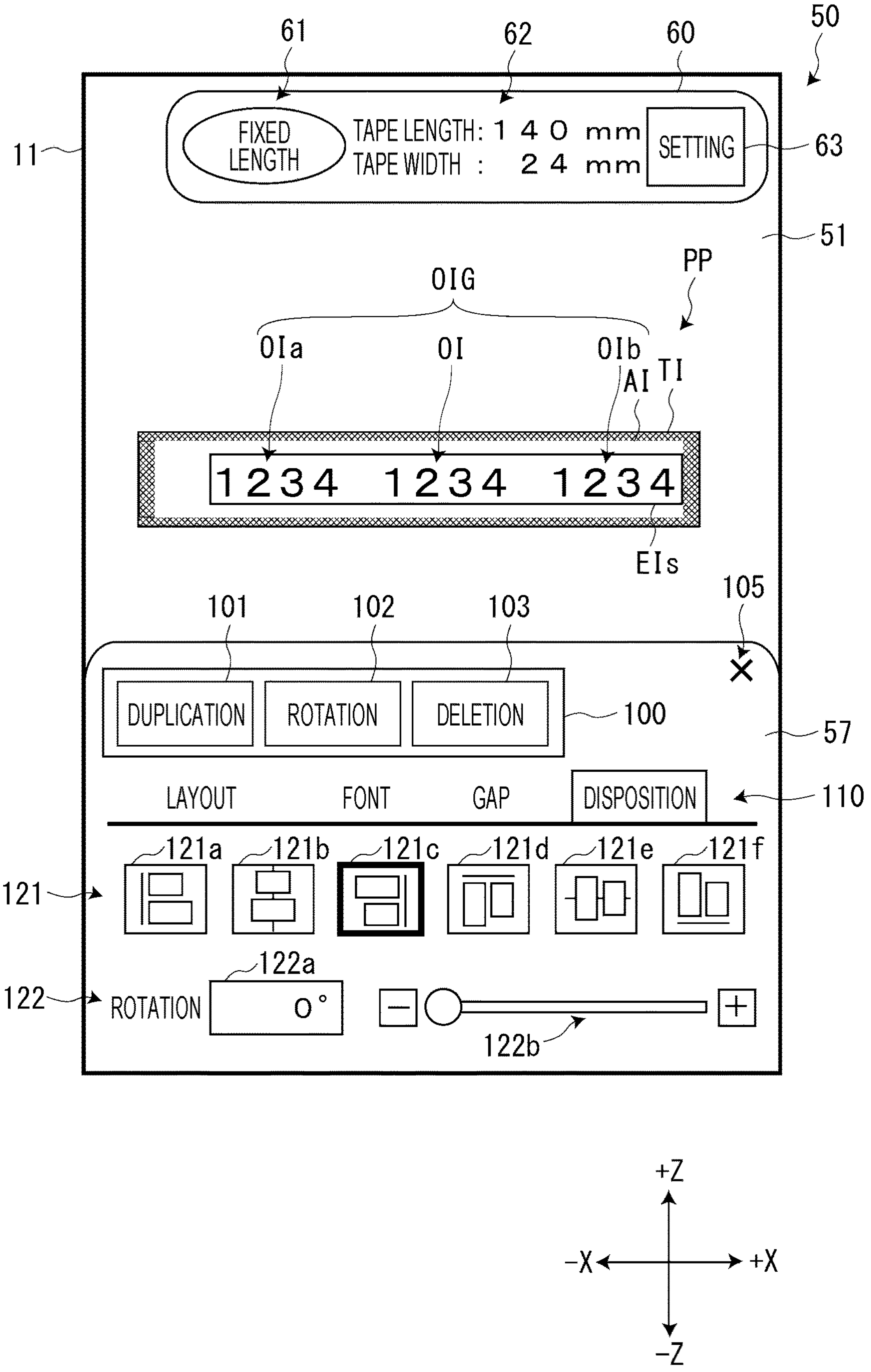
FIG. 21 is a diagram illustrating an example of the edit screen in the state in which the shortened object image area is right-aligned with respect to a print display area when a tape length setting is a fixed length.

With reference to FIG. 19 to FIG. 21, a description will be given of the present variation. In the present variation, out of a plurality of the object images OI included in the object image group OIG, the object image OI located most in the −X-direction is referred to as a first object image OIa, and the object image OI located most in the +X-direction is referred to as a last object image OIb. Also, when the user specifies the repeated text print function, the mobile terminal 1 disposes a plurality of the object images OI such that the end in the −X-direction of the first object image OIa matches the end in the −X-direction of the object image area EI. In this regard, the end in the −X-direction of the first object image OIa corresponds to the end in the −X-direction of the individual image area EI1 of the first object image OIa.

In the display controller 320 according to the present variation, when an area margin is created between the end in the +X-direction of the last object image OIb and the end in the +X-direction of the object image area EI, a shortened object image area EIs in which the end in the +X-direction of the object image area EI is moved in the −X-direction by the area margin is displayed on the touch panel 11 as illustrated in FIG. 20. In the present variation, the shortened object image area EIs is displayed on the touch panel 11 as follows. In this regard, the end in the +X-direction of the last object image OIb corresponds to the end in the +X-direction of the individual image area EI1 of the last object image OIb.

When an area margin is created between the end in the +X-direction of the last object image OIb and the end in the +X-direction of the object image area EI, the display controller 320 displays on the touch panel 11 a message 131 prompting the user to select whether or not to display a shortened object image area EIs on the touch panel 11 as illustrated in FIG. 19. When the user selects to display the shortened object image area EIs, the display controller 320 displays the shortened object image area EIs on the touch panel 11. Whereas, when the user selects not to display the shortened object image area EIs, the display controller 320 does not display the shortened object image area EIs on the touch panel 11 and displays the object image area EI on the touch panel 11.

FIG. 19 is a diagram illustrating an example of the edit screen 50 according to the present variation. When text is input in the text input field 91 and the completion button 92 is selected as illustrated in FIG. 8, in a case in which an area margin is created, the mobile terminal 1 displays a selection dialog 130 illustrated in FIG. 19 on the edit screen 50. Also, when a setting value is changed in the area length setting area 111 in the object edit area 57 or the disposition space setting area 112 as illustrated in FIG. 11, in a case in which an area margin is created, the mobile terminal 1 displays the selection dialog 130 on the edit screen 50. Here, as illustrated in FIG. 12, it is assumed that the input length is changed to "130 mm" in the area length setting area 111, and an area margin is created.

A message 131, a second OK button 132, and a NO button 133 are displayed in the selection dialog 130. The message 131 has the contents prompting the user to select whether or not to display a shortened object image area EIs.

When the second OK button 132 is selected, the mobile terminal 1 determines that the user has selected to display a shortened object image area EIs, and displays the shortened object image area EIs in the print preview area 51 as illustrated in FIG. 20. Whereas when the NO button 133 is selected, the mobile terminal 1 determines that the user has selected not to display the shortened object image area EIs, and displays the object image area EI in the print preview area 51 as illustrated in FIG. 12.

In this manner, with the mobile terminal 1 according to the present variation, the user is able to confirm the shortened object image area EIs. Also, when the tape length setting is "free length", as illustrated in FIG. 20, it is possible to match the end in the +X-direction of the print display area AI and the end in the +X-direction of the shortened object image area EIs, and thus the user is able to obtain a good looking printed material without an area margin.

In this regard, as illustrated by the tape length setting information 61 in FIG. 21, when the tape length setting is "fixed length", just displaying a shortened object image area EIs may result in a case in which the end in the +X-direction of the print display area AI does not match the end in the +X-direction of the shortened object image area EIs. However, with the mobile terminal 1 according to the present variation, a shortened object image area EIs is displayed, and thus it is possible for the user to move the shortened object image area EIs so as to match the positions of the print display area AI and the shortened object image area EIs.

Second Variation

When an area margin is created, the mobile terminal 1 may display a shortened object image area EIs in the print preview area 51 without displaying the selection dialog 130 illustrated in FIG. 19 on the edit screen 50.

Third Variation

When an area margin is created, the mobile terminal 1 may additionally display the object image OI. For example, it is assumed that the input length is changed to "130 mm" so that an area margin is created in the area length setting area 111 on the edit screen 50 illustrated in FIG. 11. In this case, the mobile terminal 1 displays the print preview PP illustrated in FIG. 22.

Figure 22:
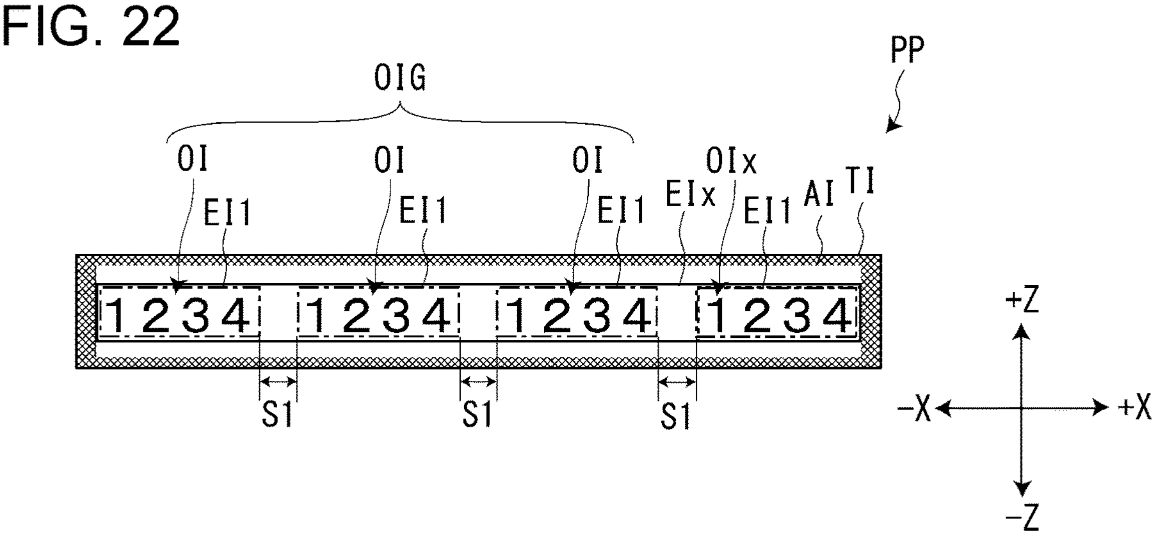
FIG. 22 is an explanatory diagram of the print preview according to a third variation.

In the print preview PP illustrated in FIG. 22, one object image OI is additionally displayed with a display disposition space SI corresponding to the input space in the +X-direction of the object image group OIG illustrated in print preview PP in FIG. 13. In FIG. 22, the object image OI is indicated as an additional object image OIx. Also, thereby, the end in the +X-direction of the object image area EI is moved in the +X-direction such that the end in the +X-direction of the additional object image OIx matches the end in the +X-direction of the object image area EI. In FIG. 22, the object image area EI is illustrated as an extended object image area EIx. In this manner, with the mobile terminal 1 according to the present variation, the length of the object image area EI is extended, but the user is able to obtain a good looking printed material without creating an area margin.

In this regard, as an application of the present variation, the mobile terminal 1 may additionally display a choice to additionally display the object image OI in the choices of the selection dialog 130 illustrated in FIG. 19. When the choice is selected, the mobile terminal 1 should additionally display one object image OI in the +X-direction of the last object image OIb.

Also, as an application of the present variation, the mobile terminal 1 may automatically update the display input length in the area length input field 111*a* in accordance with the display area length EIL of the extended object image area EIx.

Fourth Variation

When an area margin is created, the mobile terminal 1 may extend the length in the X-axis direction of the display disposition space SI. For example, it is assumed that in the area length setting area 111 on the edit screen 50 illustrated in FIG. 11, the input length is changed to "130 mm" so that an area margin is created. In this case, the mobile terminal 1 displays the print preview PP illustrated in FIG. 23.

Figure 23:
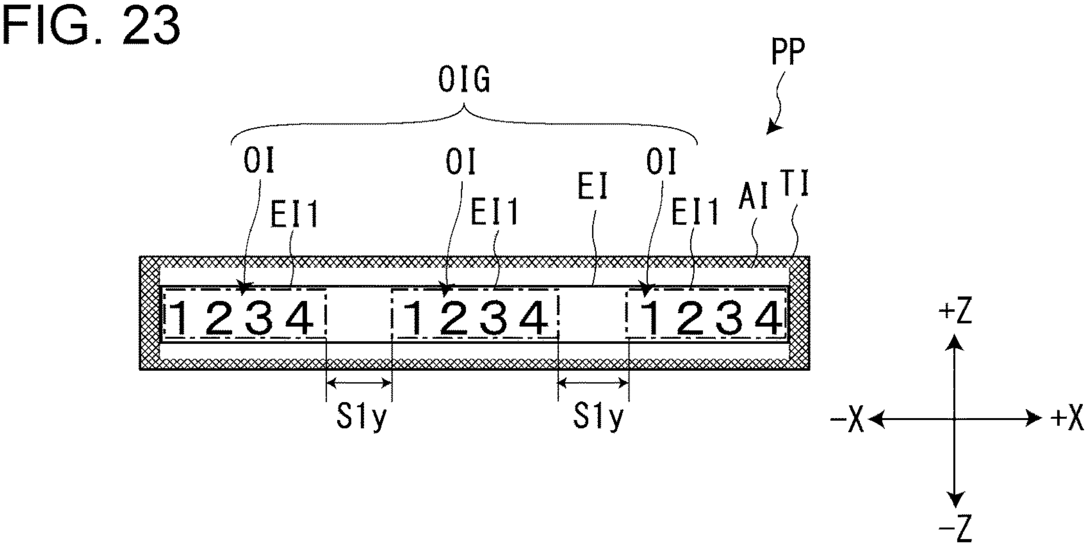
FIG. 23 is an explanatory diagram of the print preview according to a fourth variation.

In the print preview PP illustrated in FIG. 23, assuming that the number of the object images OI included in the object image group OIG is "n", and the length in the X-axis direction of the area margin is divided by "n−1", "n−1" display disposition spaces SI are individually extended by the divided length. In FIG. 23, the extended display disposition space SI is indicated as an extended display disposition space SIy. In this manner, with the mobile terminal 1 according to the present variation, although the length of the display disposition space SI is changed, the user is able to obtain a good looking printed material without creating an area margin.

In this regard, as an application of the present variation, the mobile terminal 1 may additionally display a choice to extend the display disposition space SI in the choices of the selection dialog 130. When the choice is selected, the mobile terminal 1 should extend the individual length of the "n−1" display disposition spaces SI.

Also, as an application of the present variation, the mobile terminal 1 may automatically update the input space displayed in the input space input field 112*a* in accordance with the length of the extended display disposition space SIy.

Fifth Variation

When an area margin is created, the mobile terminal 1 may dispose the object image group OIG so as to locate the center in the X-axis direction of the object image group OIG at the center in the X-axis direction of the object image area EI. For example, it is assumed that the input length is changed to "130 mm" in the area length setting area 111 on the edit screen 50 illustrated in FIG. 11 so that an area margin is created. In this case, the mobile terminal 1 displays the print preview PP illustrated in FIG. 24.

Figure 24:
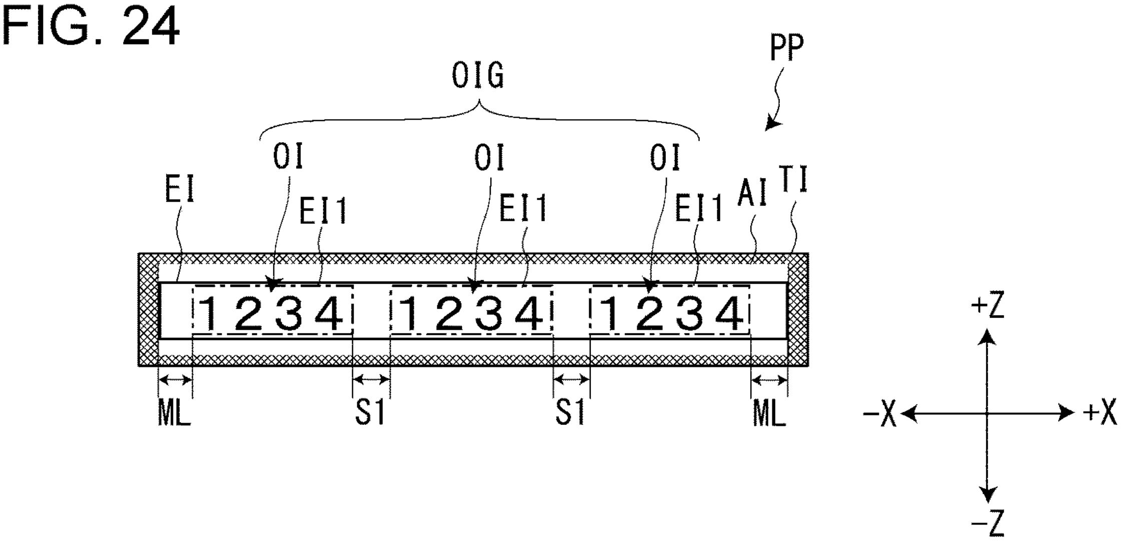
FIG. 24 is an explanatory diagram of the print preview according to a fifth variation.

In the print preview PP illustrated in FIG. 24, a ½ margin, which is a margin with the length ½ the length of the area margin in the X-axis direction, is added to the object image group OIG in the −X-direction and in the +X-direction. In FIG. 24, the length ½ that of the margin in the X-axis direction is indicated as a margin length ML. In this manner, with the mobile terminal 1 according to the present variation, the user is able to obtain a good looking printed material with equal margins at both ends in the X-axis direction on the tape T.

In this regard, as an application of the present variation, the mobile terminal 1 may display a choice to dispose the object image group OIG such that the center of the object image group OIG in the X-axis direction is located at the center of the object image area EI in the X-axis direction in addition to the choices of the selection dialog 130. When the choice is selected, the mobile terminal 1 may add ½ margin to both the −X-direction and the +X-direction of the object image group OIG.

Sixth Variation

The mobile terminal 1 may display the object image area EI all the time on the edit screen 50. That is, the mobile terminal 1 may display the object image area EI on the edit screen 50 not only in the selected state of the object image area EI, but also in the deselected state.

Seventh Variation

When the mobile terminal 1 rotates the object image OI, the mobile terminal 1 does not necessarily have to rotate the object image OI around the center EC of the individual image area EI1. For example, the mobile terminal 1 may rotate the object image OI around the corner of the individual image area EI1.

Eighth Variation

The embodiment described above may be applied to the tape printer 2. That is, the tape printer 2 may realize the individual functions illustrated in FIG. 5. In the present variation, the individual functions illustrated in FIG. 5 are all realized by the printer CPU 44*a* executing the control program stored in the printer ROM 44*b*.

Ninth Variation

The "information processing apparatus" may be an information processing terminal difficult to carry such as a desktop personal computer or the like instead of the mobile terminal 1. Also, the "print medium" may be a medium other than the tape T such as a copy paper or the like. Also, the object OJ may not be text and may be an image such as a GIF file or the like. Also, the dedicated application 31 may be provided to a customer as a program. Also, a storage medium on which the dedicated application 31 is stored may be provided to the customer. In addition, variations may be suitably made without departing from the spirit of the present disclosure.

APPENDIXES

In the following, additional descriptions will be given of the information processing apparatus, the printer, the control method of the information processing apparatus, and the non-transitory computer-readable storage medium storing the program.

A mobile terminal 1 includes: an acquisition section 310 configured to obtain input information, an input space, and an input length, input information; and a generation section 330 configured to generate print data in accordance with the obtained input information, the input space, and the input length such that an object OJ based on the input information is repeatedly disposed on a tape T in the X-axis direction with a disposition space SJ corresponding to the input space between the object OJ with each other, and a maximum number of the objects OJ accommodated in an object area OF being an area on the tape T with an area length corresponding to the input length in the X-axis direction are printed in the object area OE.

A tape printer 2 including: an acquisition section 310 configured to obtain input information, an input space, and an input length; a generation section 330 configured to generate print data in accordance with the obtained input information, the input space, and the input length such that an object OJ based on the input information is repeatedly disposed on a tape T in the X-axis direction with a disposition space SJ corresponding to the input space between the objects OJ with each other, and a maximum number of the objects OJ accommodated in an object area OE being an area on the tape T with an area length corresponding to the input length in the X-axis direction are printed in the object area OE; and a print section 43 configured to print the object OJ on the tape T in accordance with the print data.

A control method of the mobile terminal 1, the control method causing the mobile terminal 1 to perform processing including: obtaining input information, an input space, and an input length; and generating print data in accordance with the obtained input information, the input space, and the input length such that an object OJ based on the input information is repeatedly disposed on the tape T in the X-axis direction with a disposition space SJ corresponding to the input space between the objects OJ with each other, and a maximum number of the objects OJ accommodated in an object area OE being an area on the tape T with an area length corresponding to the input length in the X-axis direction are printed in the object area OE.

A non-transitory computer-readable storage medium storing a dedicated application 31, the dedicated application 31 causing the mobile terminal 1 to perform processing including: obtaining input information, an input space, and an input length; and generating print data in accordance with the obtained input information, the input space, and the input length such that an object OJ based on the input information is repeatedly disposed on the tape T in the X-axis direction with a disposition space SJ corresponding to the input space between objects OJ with each other, and a maximum number of the objects OJ are printed in an object area OF being an area on the tape T with an area length corresponding to the input length in the X-axis direction.

With this configuration, the mobile terminal 1 generates print data such that the object OJ based on the input information is repeatedly disposed on the tape T in the X-axis direction with a disposition space SJ between the objects OJ with each other, and a maximum number of the objects OJ accommodated in the object area OE with an area length OEL in the X-axis direction are printed in the object area OE. Thereby, the user is able to obtain a good looking printed material on which the object OJ is repeatedly disposed on the tape T in the X-axis direction, and the objects OJ are printed without being cut off.

The mobile terminal 1 described above may further include a touch panel 11 configured to display a tape image TI simulating the tape T and an object image OI simulating the object OJ; and a display controller 320 configured to perform display control of the touch panel 11 in accordance with the obtained input information, the input space, and the input length such that the object image OI based on the input information is repeatedly disposed on the tape image TI in the X-axis direction with a display disposition space SI corresponding to the input space between the object images OI with each other, and a maximum number of the object images OI accommodated in an object image area EI being a displayable area on the tape image TI with a display area length corresponding to the input length in the X-axis direction are displayed in the object image area EI.

With this configuration, the mobile terminal 1 performs display control of the touch panel 11 such that the object image OI based on the input information is repeatedly disposed on the tape image TI in the X-axis direction with a display disposition space SI between the object images with each other, and a maximum number of the object images accommodated in an object image area EI with a display area length EIL as the length in the X-axis direction are displayed in the object image area EI. Thereby, the user is able to predict a print result by the display on the touch panel 11.

In the mobile terminal 1 described above, the acquisition section 310 may obtain format information indicating a format setting of an object image group OIG including a plurality of object images OI repeatedly disposed in the X-axis direction, and when the format information is obtained, the display controller 320 may display a plurality of the object images OI included in the object image group OIG on touch panel 11 in units of the object image group OIG with reflecting the format setting indicated by the format information.

With this configuration, the user is able to reflect the format setting on a plurality of the object images OI included in the object image group OIG in units of the object image group OIG.

In the mobile terminal 1 described above, the acquisition section 310 may obtain rotation information indicating the rotation of the object image OI as the format information, and when the rotation information is obtained, the display controller 320 may display a plurality of the object images OI included in the object image group OIG on the touch panel 11 with reflecting the format setting indicated by the rotation information on a plurality of the object images OI by rotating the object images OI per the respective object images OI.

With this configuration, the user is able to rotate a plurality of the object images OI included in the object image group OIG all at once.

In the mobile terminal 1 described above, the acquisition section 310 may obtain a duplication instruction of the object image group OIG, and when the duplication instruction is obtained, the display controller 320 may duplicate the object image group OIG and display a plurality of the object image groups OIG on the touch panel 11.

With this configuration, the user duplicates the object image group OIG so as to display a plurality of object image groups OIG on the touch panel 11 without newly inputting the input information, the input length, and the input space.

In the mobile terminal 1 described above, the display controller 320 may display the object image area EI on the touch panel 11.

With this configuration, the user is able to confirm the object image area EI.

In the mobile terminal 1 described above, when a plurality of object images OI are disposed such that the end in the −X-direction of a first object image OIa located most in the −X-direction among a plurality of object images OI included in the object image group OIG matches the end of the object image area EI in the −X-direction, in a case in which a margin is created between the end in the +X-direction of the last object image OIb located most in the +X-direction among a plurality of the object images OI and the end in the +X-direction of the object image area EI, the display controller 320 may display a shortened object image area EIs in which the end of the object image area EI in the +X-direction is moved in the −X-direction by the margin on the touch panel 11.

With this configuration, the user is able to confirm a shortened object image area EIs in which a margin area not including an object image OI has been deleted in the object image area EI.

In the mobile terminal 1 described above, when a plurality of the object images OI are disposed such that the end in the −X-direction of the first object image OIa matches the end in the −X-direction of the object image area EI, in a case in which a margin is created between the end in the +X direction of the last object image OIb and an end in the +X-direction of the object image area EI, the display controller 320 may display on the touch panel 11 a message 131 prompting a user to select whether or not to display a shortened object image area EIs on the touch panel 11. When the user selects to display the shortened object image area EIs on the touch panel 11, the mobile terminal 1 displays the shortened object image area EIs on the touch panel 11, whereas when the user selects not to display the shortened object image area EIs on the touch panel 11, the mobile terminal 1 displays the object image area EI on the touch panel 11.

With this configuration, the user is able to select whether or not to display a shortened object image area EIs on the touch panel 11.

What is claimed is:

1. An information processing apparatus comprising:

a processor configured to:

obtain input information including format information indicating a format setting of an object image group including a plurality of the object images repeated in a display direction, an input space, and an input length; and generate print data in accordance with the input information obtained, the input space, and the input length such that an object based on the input information is repeated on a print medium in a medium direction with a disposition space corresponding to the input space between the objects with each other, and a maximum number of the objects accommodated in an object area being an area on the print medium with an area length corresponding to the input length in the medium direction are printed in the object area; and a display configured to display a medium image simulating the print medium and an object image simulating the object; wherein the processor is configured to control the display to repeatedly display the object image on the medium image in a display direction with a display disposition space corresponding to the input space between the object images, a maximum number of the object images in an object image area being a displayable area on the medium image with a display area length corresponding to the input length in the display direction in the object image area; and to display a shortened object image area created by shortening the object image area by a margin between a last object image and an end of the object image area.

2. The information processing apparatus according to claim 1, wherein when an end of a first object image of the object images in the display direction matches the end of the object image area in the display direction, and the margin is between an end of the last object image and the end of the object image area, the processor is configured to control the display to display a message prompting a user to select whether or not to display the shortened object image area on the display, and when the user selects to display the shortened object image area on the display, the processor is configured to control the display to display the shortened object image area, and when the user selects not to display the shortened object image area on the display, the processor is configured to control the display to display the object image area.

3. A printer comprising:

a processor configured to:

obtain input information including format information indicating a format setting of an object image group including a plurality of the object images repeated in a display direction, an input space, and an input length;

generate print data in accordance with the input information obtained, the input space, and the input length such that an object based on the input information is repeated on a print medium in a medium direction with a disposition space corresponding to the input space between the objects with each other, and a maximum number of the objects accommodated in an object area being an area on the print medium with an area length corresponding to the input length in the medium direction are printed in the object area;

a print section configured to print the object on the print medium in accordance with the print data; and a display configured to display a medium image simulating the print medium and an object image simulating the object; wherein the processor is configured to control the display to repeatedly display the object image on the medium image in a display direction with a display disposition space corresponding to the input space between the object images, a maximum number of the object images in an object image area being a displayable area on the medium image with a display area length corresponding to the input length in the display direction in the object image area; and to display a shortened object image area created by shortening the object image area by a margin between a last object image and an end of the object image area.

4. A control method of an information processing apparatus, the control method causing the information processing apparatus to perform processing comprising:

obtaining input information including format information indicating a format setting of an object image group including a plurality of the object images repeated in a display direction, an input space, and an input length; and generating print data in accordance with the input information obtained, the input space, and the input length such that an object based on the input information is repeated on a print medium in a medium direction with a disposition space corresponding to the input space between the objects with each other, and a maximum number of the objects accommodated in an object area being an area on the print medium with an area length corresponding to the input length in the medium direction are printed in the object area;

displaying, on a display, a medium image simulating the print medium and an object image simulating the object; and controlling the display to repeatedly display the object image on the medium image in a display direction with a display disposition space corresponding to the input space between the object images, a maximum number of the object images in an object image area being a displayable area on the medium image with a display area length corresponding to the input length in the display direction in the object image area; and to display a shortened object image area created by shortening the object image area by a margin between a last object image and an end of the object image area.

5. A non-transitory computer-readable storage medium storing a program, the program causing an information processing apparatus to perform processing comprising:

obtaining input information including format information indicating a format setting of an object image group including a plurality of the object images repeated in a display direction, an input space, and an input length; and generating print data in accordance with the input information obtained, the input space, and the input length such that an object based on the input information is repeated on a print medium in a medium direction with a disposition space corresponding to the input space between the objects with each other, and a maximum number of the objects accommodated in an object area being an area on the print medium with an area length corresponding to the input length in the medium direction are printed in the object area;

displaying, on a display, a medium image simulating the print medium and an object image simulating the object; and controlling the display to repeatedly display the object image on the medium image in a display direction with a display disposition space corresponding to the input space between the object images, a maximum number of the object images in an object image area being a displayable area on the medium image with a display area length corresponding to the input length in the display direction in the object image area; and to display a shortened object image area created by shortening the object image area by a margin between a last object image and an end of the object image area.

* * * * *